US011764937B2

(12) United States Patent
Abotabl et al.

(10) Patent No.: US 11,764,937 B2
(45) Date of Patent: Sep. 19, 2023

(54) USING DIFFERENT TIME DOMAIN PATTERNS BASED ON A TIMER

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/202,227

(22) Filed: Mar. 15, 2021

(65) Prior Publication Data

US 2022/0294602 A1    Sep. 15, 2022

(51) Int. Cl.
*H04W 4/00* (2018.01)
*H04L 5/14* (2006.01)
*H04W 72/0446* (2023.01)
*H04L 5/00* (2006.01)

(52) U.S. Cl.
CPC .......... *H04L 5/1469* (2013.01); *H04L 5/0082* (2013.01); *H04W 72/0446* (2013.01)

(58) Field of Classification Search
None
See application file for complete search history.

(56) References Cited

U.S. PATENT DOCUMENTS

| 2016/0329993 | A1* | 11/2016 | Kim | .................. H04W 24/02 |
| 2018/0091285 | A1* | 3/2018 | Hosseini | .............. H04L 5/0053 |
| 2019/0132109 | A1* | 5/2019 | Zhou | .................... H04L 5/001 |
| 2020/0021421 | A1* | 1/2020 | Han | ....................... H04L 5/14 |
| 2021/0377939 | A1* | 12/2021 | Chae | .................... H04L 5/001 |

* cited by examiner

*Primary Examiner* — Zewdu A Beyen
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of at least two time division duplex (TDD) patterns. The UE may communicate based at least in part on a first pattern of the at least two TDD patterns. The UE may communicate based at least in part on a second pattern of the at least two TDD patterns, based at least in part on a timer, associated with the first pattern, expiring. In some aspects, the UE may further communicate based at least in part on a third pattern of the at least two TDD patterns. The UE may use the third pattern before the timer associated with the first pattern expires or based at least in part on expiry of an additional timer associated with the second pattern. Numerous other aspects are described.

30 Claims, 14 Drawing Sheets

USING DIFFERENT TIME DOMAIN PATTERNS BASED ON A TIMER

FIELD OF THE DISCLOSURE

Aspects of the present disclosure generally relate to wireless communication and to techniques and apparatuses for using different time domain patterns based on a timer.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to receive, from a base station, an indication of at least two time division duplex (TDD) patterns; transmit or receive based at least in part on a first pattern of the at least two TDD patterns; and transmit or receive based at least in part on a second pattern of the at least two TDD patterns, based at least in part on a timer, associated with the first pattern, expiring.

In some aspects, a base station for wireless communication includes a memory and one or more processors coupled to the memory, the memory and the one or more processors configured to transmit, to a UE, an indication of at least two time domain patterns; transmit or receive based at least in part on a first pattern of the at least two time domain patterns; and transmit or receive based at least in part on a second pattern of the at least two time domain patterns, based at least in part on a timer, associated with the first pattern, expiring.

In some aspects, a method of wireless communication performed by a UE includes receiving, from a base station, an indication of at least two time domain patterns; transmitting or receiving based at least in part on a first pattern of the at least two time domain patterns; and transmitting or receiving based at least in part on a second pattern of the at least two time domain patterns, based at least in part on a timer, associated with the first pattern, expiring.

In some aspects, a method of wireless communication performed by a base station includes transmitting, to a UE, an indication of at least two time domain patterns; transmitting or receiving based at least in part on a first pattern of the at least two time domain patterns; and transmitting or receiving based at least in part on a second pattern of the at least two time domain patterns, based at least in part on a timer, associated with the first pattern, expiring.

In some aspects, a non-transitory computer-readable medium storing a set of instructions for wireless communication includes one or more instructions that, when executed by one or more processors of a UE, cause the UE to receive, from a base station, an indication of at least two time domain patterns; transmit or receive based at least in part on a first pattern of the at least two time domain patterns; and transmit or receive based at least in part on a second pattern of the at least two time domain patterns, based at least in part on a timer, associated with the first pattern, expiring.

In some aspects, a non-transitory computer-readable medium storing a set of instructions for wireless communication includes one or more instructions that, when executed by one or more processors of a base station, cause the base station to transmit, to a UE, an indication of at least two time domain patterns; transmit or receive based at least in part on a first pattern of the at least two time domain patterns; and transmit or receive based at least in part on a second pattern of the at least two time domain patterns, based at least in part on a timer, associated with the first pattern, expiring.

In some aspects, an apparatus for wireless communication includes means for receiving, from a base station, an indication of at least two time domain patterns; means for transmitting or means for receiving based at least in part on a first pattern of the at least two time domain patterns; and means for transmitting or means for receiving based at least in part on a second pattern of the at least two time domain patterns, based at least in part on a timer, associated with the first pattern, expiring.

In some aspects, an apparatus for wireless communication includes means for transmitting, to a UE, an indication of at least two time domain patterns; means for transmitting or means for receiving based at least in part on a first pattern of the at least two time domain patterns; and means for transmitting or means for receiving based at least in part on a second pattern of the at least two time domain patterns, based at least in part on a timer, associated with the first pattern, expiring.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
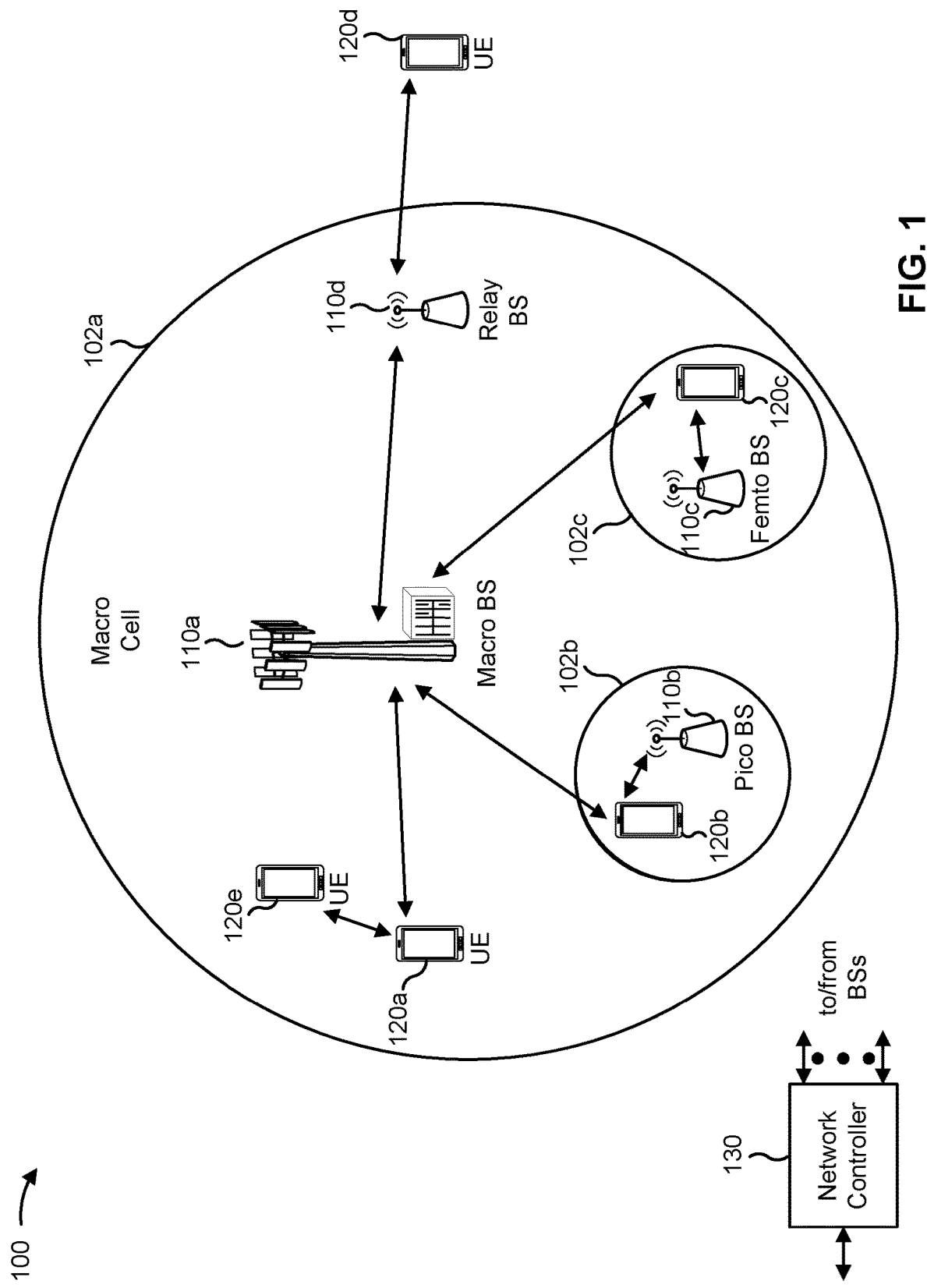
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
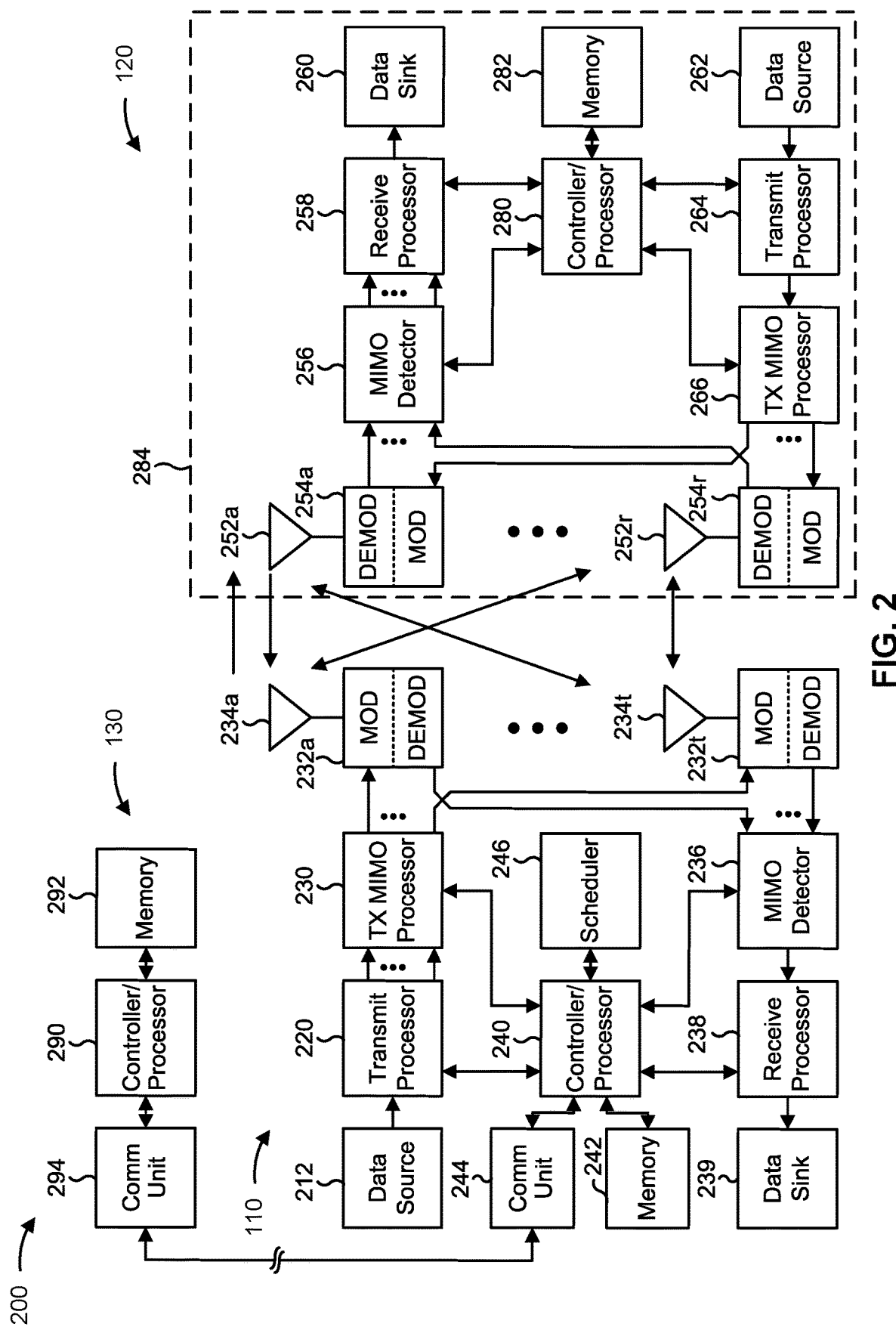
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6A-7B).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6A-7B).

Controller/processor 240 of base station 110, controller/processor 280 of UE 120, and/or any other component(s) of FIG. 2 may perform one or more techniques associated with using different t time domain patterns based on a timer, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for receiving, from a base station (e.g., the base station 110 and/or apparatus 1100 of FIG. 11), an indication of at least two time domain patterns; means for transmitting and/or means for receiving based at least in part on a first pattern of the at least two time domain patterns; and/or means for transmitting and/or means for receiving based at least in part on a second pattern of the at least two time domain patterns, based at least in part on a timer, associated with the first pattern, expiring. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for receiving, from the base station, an instruction to switch to the first pattern from another of the at least two time domain patterns. Additionally, or alternatively, the UE may include means for transmitting, to the base station, an indication that the UE has switched from another of the at least two time domain patterns to the first pattern.

In some aspects, the UE may further include means for transmitting and/or means for receiving based at least in part on a third pattern of the at least two time domain patterns before the timer, associated with the first pattern, expires. As an alternative, the UE may include means for transmitting and/or means for receiving based at least in part on a third pattern of the at least two time domain patterns, based at least in part on an additional timer, associated with the second pattern, expiring.

In some aspects, a base station (e.g., the base station 110 and/or apparatus 1100 of FIG. 11) may include means for transmitting, to a UE (e.g., the UE 120 and/or apparatus 1000 of FIG. 10), an indication of at least two time domain patterns; means for transmitting and/or means for receiving based at least in part on a first pattern of the at least two time domain patterns; and/or means for transmitting and/or means for receiving based at least in part on a second pattern of the at least two time domain patterns, based at least in part on a timer, associated with the first pattern, expiring. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for transmitting, to the UE, an instruction to switch to the first pattern from another of the at least two time domain patterns. Additionally, or alternatively, the base station may include means for receiving, from the UE, an indication that the UE has switched from another of the at least two time domain patterns to the first pattern.

In some aspects, the base station may further include means for transmitting and/or means for receiving based at least in part on a third pattern of the at least two time domain patterns before the timer, associated with the first pattern, expires. As an alternative, the base station may include means for transmitting and/or means for receiving based at least in part on a third pattern of the at least two time domain patterns, based at least in part on an additional timer, associated with the second pattern, expiring.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
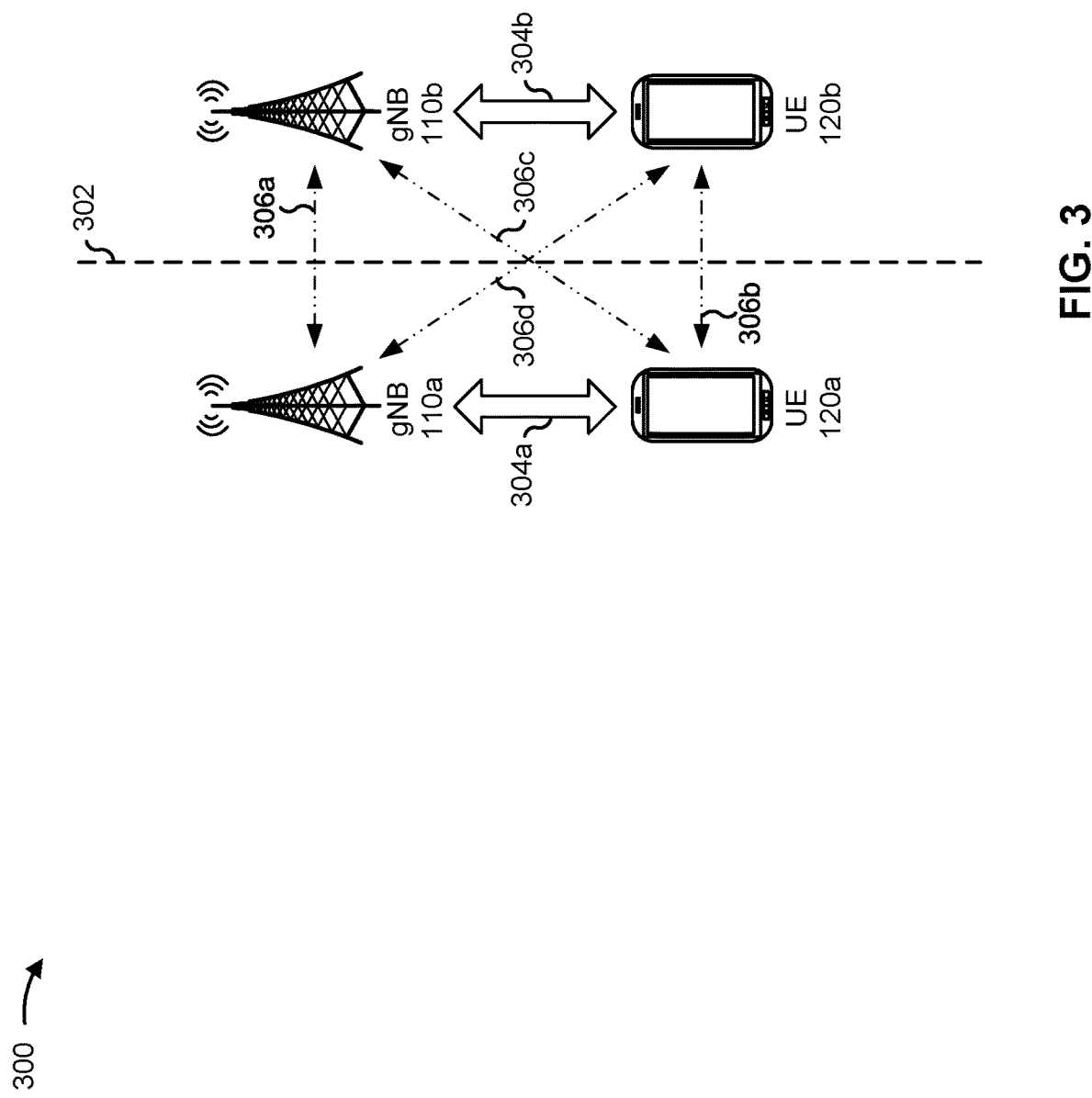
FIG. 3 is a diagram illustrating an example of cross-border interference, in accordance with the present disclosure.

FIG. 3 is a diagram illustrating an example 300 of cross-border interference, in accordance with the present disclosure. As shown in FIG. 3, example 300 includes a gNB 110a communicating wirelessly with a UE 120a on a first cell (e.g., using a first wireless link 304a) and a gNB 110b communicating wirelessly with a UE 120b on a second cell (e.g., using a second wireless link 304b). Accordingly, a border 302 may separate the cells.

In some aspects, the first cell and the second cell may be associated with a same operator or with operators that cooperate. Accordingly, the gNB 110a and the gNB 110b may coordinate (e.g., using a wired and/or wireless backhaul) to reduce interference between signals carrying communications between the gNB 110a and the UE 120a and signals carrying communications between the gNB 110b and the UE 120b. For example, the gNB 110a and the gNB 110b may select resources in time, frequency, and/or space that are less likely to interfere with each other. However, when the first cell and/or the second cell are using an asynchronous mode of operation, the gNB 110a and the gNB 110b may be unable to coordinate. As an alternative, the first cell and the second cell may be associated with operators that do not cooperate. Accordingly, the gNB 110a and the gNB 110b may be unable to coordinate.

When the gNB 110a and the gNB 110b do not coordinate, and as shown in FIG. 3, interference 306a can occur between the gNB 110a and the gNB 110b (e.g., the gNB 110a transmits a downlink communication to the UE 120a that interferes with a downlink communication from the gNB 110b to the UE 120b). Similarly, interference 306b can occur between the UE 120a and the UE 120b (e.g., the UE 120a transmits an uplink communication to the gNB 110a that interferes with an uplink communication from the UE 120b to the gNB 110b).

Additionally, and as further shown in FIG. 3, interference 306c can occur between the gNB 110b and the UE 120a (e.g., the gNB 110b transmits a downlink communication to the UE 120b that interferes with a downlink communication from the gNB 110a to the UE 120a or the UE 120a transmits an uplink communication to the gNB 110a that interferes with an uplink communication from the UE 120b to the gNB 110b). Similarly, interference 306d can occur between the gNB 110a and the UE 120b (e.g., the gNB 110a transmits a downlink communication to the UE 120a that interferes with a downlink communication from the gNB 110b to the UE 120b or the UE 120b transmits an uplink communication to the gNB 110b that interferes with an uplink communication from the UE 120a to the gNB 110a). These interferences can decrease quality and/or reliability of communications on the first cell and/or the second cell. Additionally, these interferences can reduce throughput and/or increase latency by causing communication losses and thus additional retransmissions.

As indicated above, FIG. 3 is provided as an example. Other examples may differ from what is described with respect to FIG. 3.

Figure 4:
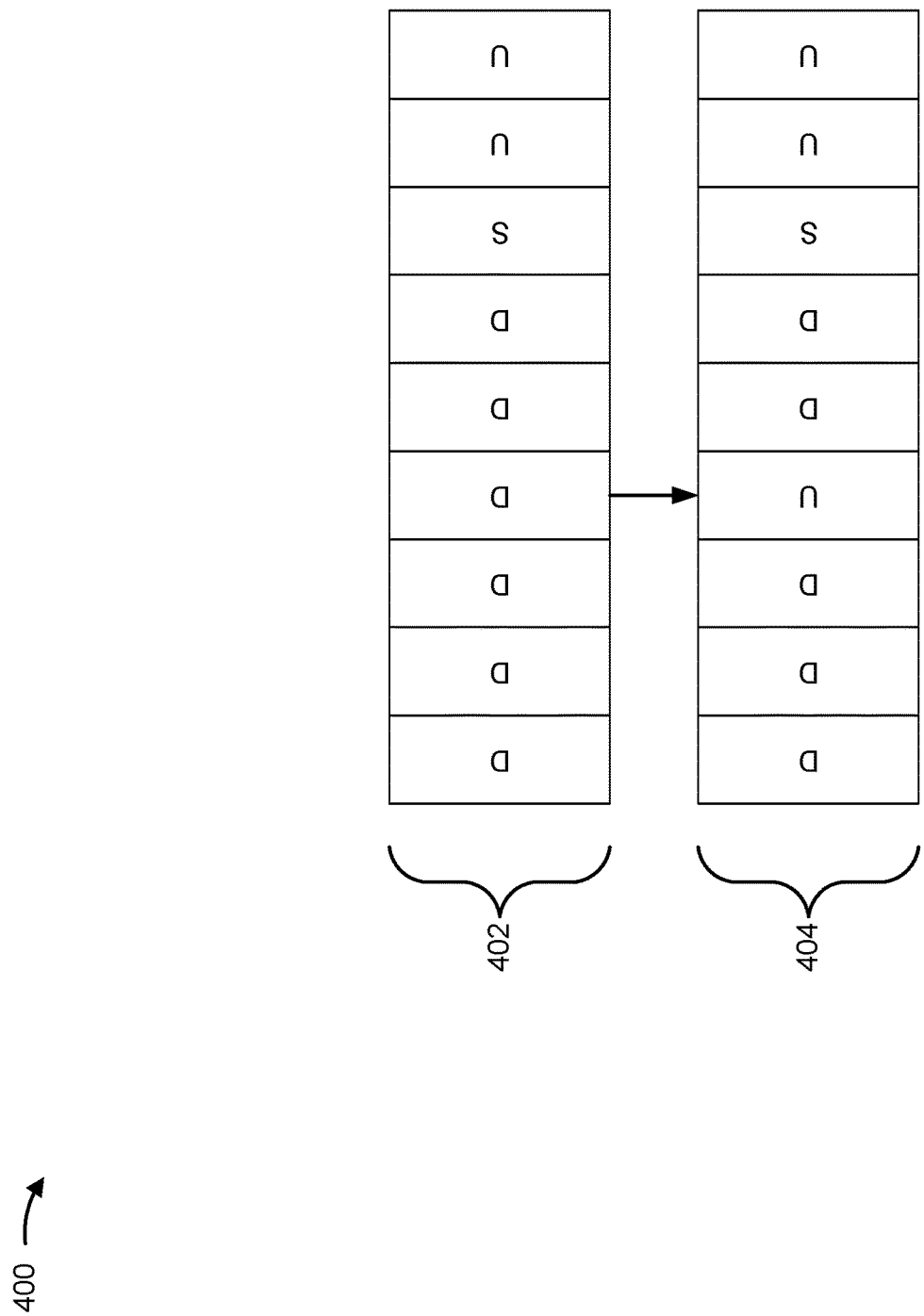
FIG. 4 is a diagram illustrating an example of opportunistic conversion of slots or symbols, in accordance with the present disclosure.

FIG. 4 is a diagram illustrating an example 400 of opportunistic conversion of slots or symbols, in accordance with the present disclosure. As shown in FIG. 4, example 400 includes a first time domain pattern 402. For example, the time domain pattern 402 may include a time division duplex (TDD) pattern. The time domain pattern 402 may include a quantity of downlink slots (e.g., six downlink slots "D" as shown in example 400), a quantity of flexible slots (e.g., one flexible slot "S" as shown in example 400), and/or a quantity of uplink slots (e.g., two uplink slots "U" as shown in example 400). As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. The first time domain pattern 402 may repeat over time. Although described below with reference to slots, the description similarly applies to a first TDD pattern with symbols (e.g., including six downlink symbols "D," one flexible symbol "S," and two uplink symbols "U," as shown in example 400). Additionally, or alternatively, the UE 120 may switch from the first time domain pattern 402 to the second time domain pattern 404 (e.g., as described below) based at least in part on an amount of time (e.g., in milliseconds (ms)).

As further shown in FIG. 4, a base station (e.g., base station 110) may instruct a UE (e.g., UE 120) to switch from the first time domain pattern 402 to the second time domain pattern 404. As an alternative, the UE 120 may indicate to the base station 110 that the UE 120 is switching from the first time domain pattern 402 to the second time domain pattern 404. The second time domain pattern 404 may repeat over time, similar to the first time domain pattern 402. In any of the aspects described above, the UE 120 may switch from the first time domain pattern 402 to the second time domain pattern 404 during a quantity of symbols and/or an amount of time (e.g., in ms). The quantity of symbols and/or the amount of time may be indicated by the base station 110 (e.g., in the instruction to switch from the first time domain pattern 402 to the second time domain pattern 404, as described above) and/or based at least in part on a programmed (and/or otherwise preconfigured) rule. For example, the rule may include a table (e.g., defined in 3GPP specifications and/or another standard) that associates different subcarrier spacings (SCSs) and/or numerologies (e.g., represented by μ and associated with corresponding SCSs) with corresponding quantities of symbols and/or amounts of time for switching time domain patterns.

In example 400, the second time domain pattern 404 includes an uplink slot "U" in place of what was a downlink slot "D" in the first time domain pattern 402. Accordingly, the UE 120 may transmit an uplink communication in an earlier slot. Other examples may include additional or alternative changes. For example, the second time domain pattern may include a downlink slot in place of what was an uplink slot in the first time domain pattern. In another example, the second time domain pattern may include a downlink slot or an uplink slot in place of what was a flexible slot in the first time domain pattern. In yet another example, the second time domain pattern may include a flexible slot in place of what was a downlink slot or an uplink slot in the first time domain pattern.

By opportunistically switching from the first time domain pattern 402 to the second time domain pattern 404, the base station 110 may reduce interference (e.g., cross-border interference as described above in connection with FIG. 3). As a result, the base station 110 and the UE 120 may experience increased quality and/or reliability of communications. Additionally, or alternatively, the base station 110 may reduce latency by opportunistically switching from the first time domain pattern 402 to the second time domain pattern 404. For example, the UE 120 may be able to transmit an uplink communication sooner using the second time domain pattern 404 rather than the first time domain pattern 402. In another example, the base station 110 may be able to transmit a downlink communication sooner using the second time domain pattern rather than first time domain pattern.

As indicated above, FIG. 4 is provided as an example. Other examples may differ from what is described with respect to FIG. 4.

Figure 5:
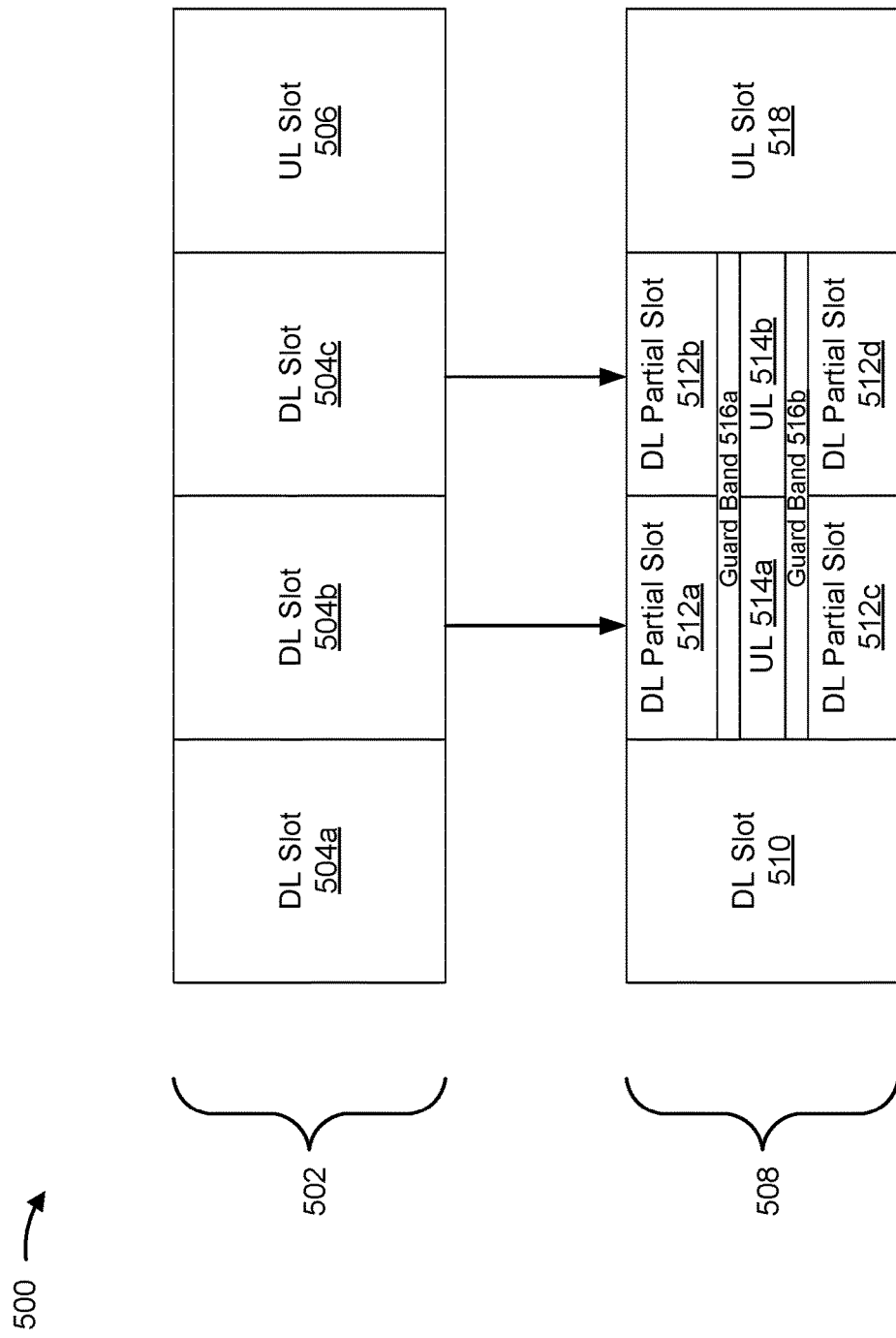
FIG. 5 is a diagram illustrating an example of opportunistic sub-band full duplex (SBFD), in accordance with the present disclosure.

FIG. 5 is a diagram illustrating an example 500 of opportunistic SBFD, in accordance with the present disclosure. As shown in FIG. 5, example 500 includes a first time domain pattern 502. In some aspects, the first time domain pattern 502 may include a slot format pattern associated with a half duplex mode or a full duplex mode. The time domain pattern 502 may include a quantity of downlink slots (e.g., three downlink slots 504a, 504b, and 504c as shown in example 500), a quantity of flexible slots, and/or a quantity of uplink slots (e.g., one uplink slot 506 as shown in example 500). The first time domain pattern 502 may repeat over time. Although described below with reference to slots, the description similarly applies to a first time domain pattern with symbols (e.g., including three downlink symbols, no flexible symbols, and one uplink symbol, as shown in example 500). Additionally, or alternatively, the UE 120 may switch from the first time domain pattern 502 to the second time domain pattern 508 (e.g., as described below) based at least in part on an amount of time (e.g., in ms).

As further shown in FIG. 5, a base station (e.g., base station 110) may instruct a UE (e.g., UE 120) to switch from the first time domain pattern 502 to the second time domain pattern 508. As an alternative, the UE 120 may indicate to the base station 110 that the UE 120 is switching from the first time domain pattern 502 to the second time domain pattern 508. The second time domain pattern 508 may repeat over time, similar to the first time domain pattern 502. In any of the aspects described above, the UE 120 may switch from the first time domain pattern 502 to the second time domain pattern 508 during a quantity of symbols and/or an amount of time (e.g., in ms). The quantity of symbols and/or the amount of time may be indicated by the base station 110 (e.g., in the instruction to switch from the first time domain pattern 502 to the second time domain pattern 508, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by µ and associated with corresponding SCSs) with corresponding quantities of symbols and/or amounts of time for switching time domain patterns.

In example 500, the second time domain pattern 508 includes two SBFD slots in place of what were downlink slots in the first time domain pattern 502. In example 500, each SBFD slot includes a partial slot (e.g., a portion or sub-band of a frequency allocated for use by the base station 110 and the UE 120) for downlink (e.g., partial slots 512a, 512b, 512c, and 512d, as shown in example 500) and a partial slot for uplink (e.g., partial slots 514a and 514b, as shown in example 500). In some aspects, partial slots for downlink may be separated from partial slots for uplink by guard bands including one or more frequencies. For example, as shown in FIG. 5, partial slots 512a and 512b for downlink are separated from partial slots 514a and 514b for uplink by guard band 516a. Similarly, partial slots 512c and 512d for downlink are separated from partial slots 514a and 514b for uplink by guard band 516b.

Accordingly, the UE 120 may transmit an uplink communication in an earlier slot. Other examples may include additional or alternative changes. For example, the second time domain pattern may include an SBFD slot in place of what was an uplink slot in the first time domain pattern. In another example, the second time domain pattern may include a downlink slot or an uplink slot in place of what was an SBFD in the first time domain pattern. In yet another example, the second time domain pattern may include a downlink slot or an uplink slot in place of what was an uplink slot or a downlink slot, respectively, in the first time domain pattern.

By opportunistically switching from the first time domain pattern 502 to the second time domain pattern 508, the base station 110 may reduce interference (e.g., cross-border interference as described above in connection with FIG. 3). As a result, the base station 110 and the UE 120 may experience increased quality and/or reliability of communications. Additionally, or alternatively, the base station 110 may reduce latency by opportunistically switching from the first time domain pattern 502 to the second time domain pattern 508. For example, the UE 120 may be able to transmit an uplink communication sooner using the second time domain pattern 508 rather than the first time domain pattern 502. In another example, the base station 110 may be able to transmit a downlink communication sooner using the second time domain pattern rather than first time domain pattern.

As indicated above, FIG. 5 is provided as an example. Other examples may differ from what is described with respect to FIG. 5.

A base station and/or a UE may use opportunistic slot or symbol conversion and/or opportunistic sub-band full duplex in order to reduce cross-border interference, reduce latency for upcoming downlink communications or uplink communications, and/or increase throughput. However, in order to convert slots or symbols, the base station generally has to transmit an instruction to the UE to use a new time domain pattern and then transmit another instruction to the UE to revert to a previous time domain pattern. As an alternative, the UE can transmit an indication to the base station that the UE is using a new time domain pattern and then transmit another indication to the base station that the UE is reverting to a previous time domain pattern. Sometimes, the new time domain pattern may be associated with a sub-band full duplex mode and the previous time domain pattern may be associated with a half duplex mode (or a paired band full duplex mode).

Some techniques and apparatuses described herein enable switching between time domain patterns based at least in part on one or more associated timers. For example, a base station (e.g., base station 110) may transmit an instruction to a UE (e.g., UE 120) to use a new time domain pattern such that the UE 120 reverts to a previous time domain pattern based at least in part on expiry of a timer. As a result, the base station 110 and the UE 120 conserve network overhead, transmission resources, and decoding resources. Similarly, the UE 120 may transmit an indication to the base station 110 that the UE 120 is using a new time domain pattern, and the base station 110 may determine when the UE 120 reverts to a previous time domain pattern based at least in part on a timer and without a subsequent indication transmitted from the UE 120 to the base station 110. As a result, the base station 110 and the UE 120 conserve network overhead, transmission resources, and decoding resources.

Figure 6A:
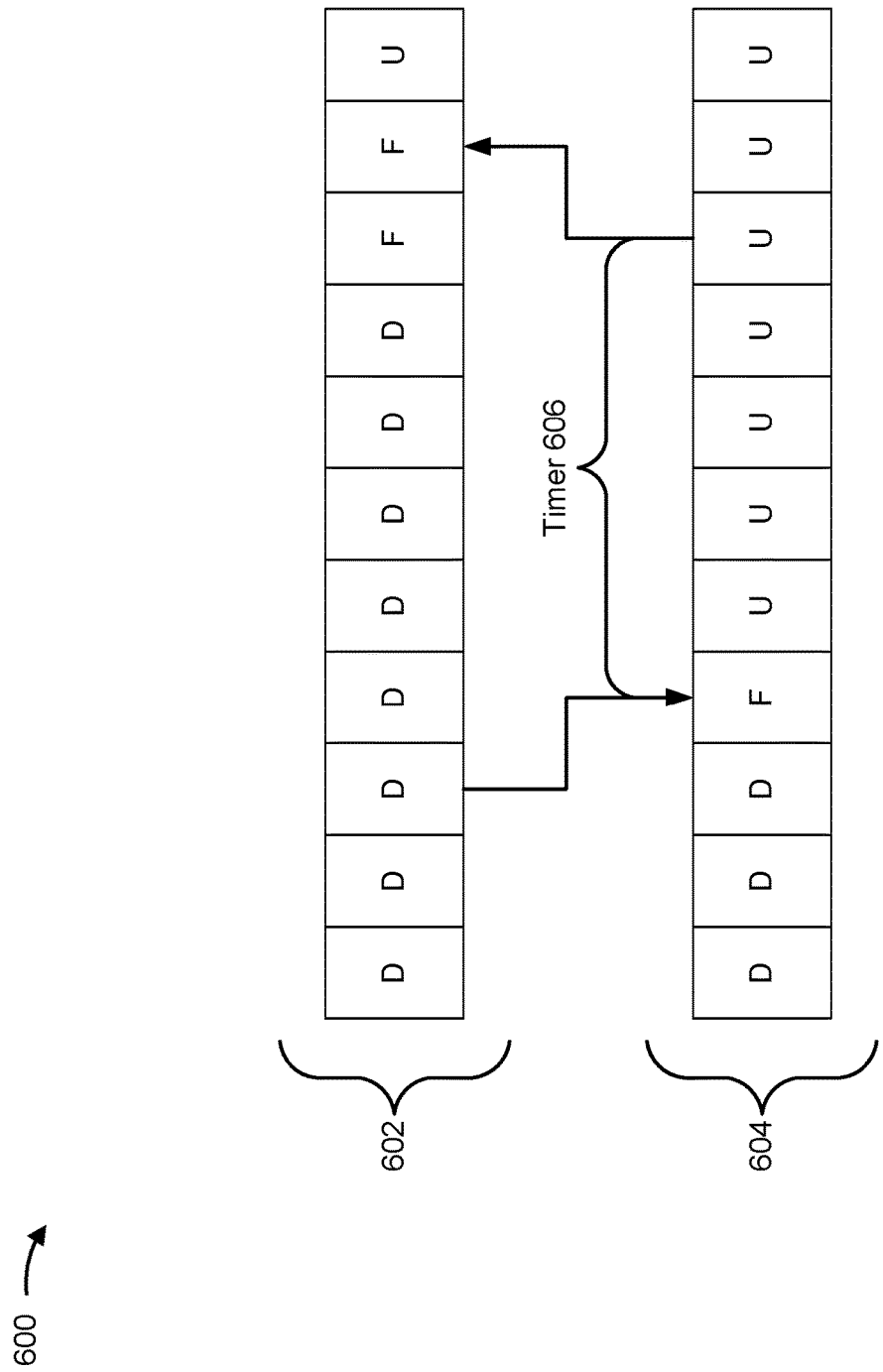
FIGS. 6A, 6B, and 6C are diagrams illustrating examples associated with using different time domain patterns based on a timer, in accordance with the present disclosure.

FIG. 6A is a diagram illustrating an example 600 associated with using different time domain patterns based on a timer, in accordance with the present disclosure. As shown in FIG. 6A, example 600 includes a first time domain pattern 602. The time domain pattern 602 may include a quantity of downlink slots (e.g., eight downlink slots "D" as shown in example 600), a quantity of flexible slots (e.g., two flexible slots "F" as shown in example 600), and/or a quantity of uplink slots (e.g., one uplink slot "U" as shown in example 600). The first time domain pattern 602 may repeat over time. Although described below with reference to slots, the description similarly applies to a first time domain pattern with symbols (e.g., including eight downlink symbols, two flexible symbols, and one uplink symbol, as shown in example 600). Additionally, or alternatively, the UE 120 may switch from the first time domain pattern 602 to a second time domain pattern 604 (e.g., as described below)

based at least in part on an amount of time (e.g., in ms). Additionally, or alternatively, although depicted as a TDD pattern (e.g., as described above in connection with FIG. 4), the first time domain pattern 602 may instead be a slot format pattern associated with a full duplex mode or a half duplex mode (e.g., as described above in connection with FIG. 5).

In some aspects the first time domain pattern 602 may be one of a plurality of candidate time domain patterns. For example, a base station (e.g., base station 110) may transmit, and a UE (e.g., UE 120) may receive, one or more indications to of the plurality of candidate time domain patterns. The indication(s) may include one or more radio resource control (RRC) messages (e.g., including a TDD-UL-DL-ConfigurationCommon data structure as defined in 3GPP specifications and/or another standard, a TDD-UL-DL-ConfigDedicated data structure as defined in 3GPP specifications and/or another standard, and/or other similar data structures), one or more medium access control (MAC) layer control elements (MAC-CEs), and/or downlink control information (DCI) (e.g., DCI format 2_0 including a slot format indicator (SFI) associated with a SlotFormatCombination data structure, as defined in 3GPP specifications and/or another standard).

Accordingly, the UE 120 may transmit to and/or receive from the base station 110 based at least in part on the first time domain pattern 602. For example, the UE 120 may transmit one or more uplink communications in uplink slot "U" and/or flexible slots "F" and/or receive one or more downlink communications in downlink slots "D" and/or flexible slots "F."

As further shown in FIG. 6A, the base station 110 may instruct the UE 120 to switch from the first time domain pattern 602 to the second time domain pattern 604. For example, the second time domain pattern 604 may be included in the plurality of candidate time domain patterns. Accordingly, the base station 110 may transmit an RRC message, a MAC-CE, and/or DCI including an index and/or another indicator associated with the second time domain pattern 604. As an alternative, the UE 120 may indicate to the base station 110 that the UE 120 is switching from the first time domain pattern 602 to the second time domain pattern 604. For example, the UE 120 may transmit an RRC message, a MAC-CE, and/or uplink control information (UCI) including the index and/or another indicator associated with the second time domain pattern 604. In some aspects, the UE 120 may transmit a request to use the second time domain pattern 604 (e.g., in an RRC message, a MAC-CE, and/or UCI), and the base station 110 may transmit an approval of the request (e.g., in an RRC message, a MAC-CE, and/or DCI). The second time domain pattern 604 may repeat over time, similar to the first time domain pattern 602.

In any of the aspects described above, the UE 120 may switch from the first time domain pattern 602 to the second time domain pattern 604 during a quantity of symbols and/or an amount of time (e.g., in ms). The quantity of symbols and/or the amount of time may be indicated by the base station 110 (e.g., in the instruction to switch from the first time domain pattern 602 to the second time domain pattern 604, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by µ and associated with corresponding SCSs) with corresponding quantities of symbols and/or amounts of time for switching time domain patterns.

In example 600, the second time domain pattern 604 includes a flexible slot "F" in place of what was a downlink slot "D" in the first time domain pattern 602. Additionally, the second time domain pattern 604 includes uplink slots "U" in place of what were downlink slots "D" and flexible slots "F" in the first time domain pattern 602. Accordingly, the UE 120 may transmit an uplink communication in an earlier slot. Other examples may include additional or alternative changes. For example, the second time domain pattern may include a downlink slot in place of what was an uplink slot in the first time domain pattern. In another example, the second time domain pattern may include a downlink slot in place of what was a flexible slot in the first time domain pattern. In yet another example, the second time domain pattern may include a flexible slot in place of what was an uplink slot in the first time domain pattern. Other examples may additionally or alternatively include changes associated with SBFD. For example, the second time domain pattern may include an SBFD slot in place of what was an uplink slot in the first time domain pattern. In another example, the second time domain pattern may include a downlink slot or an uplink slot in place of what was an SBFD slot in the first time domain pattern.

The UE 120 may transmit to and/or receive from the base station 110 based at least in part on the second time domain pattern 604. For example, the UE 120 may transmit one or more uplink communications in uplink slot "U" and/or flexible slots "F" and/or receive one or more downlink communications in downlink slots "D" and/or flexible slots "F."

By opportunistically switching from the first time domain pattern 602 to the second time domain pattern 604, the base station 110 and/or the UE 120 may reduce interference (e.g., cross-border interference as described above in connection with FIG. 3). As a result, the base station 110 and the UE 120 may experience increased quality and/or reliability of communications. Additionally, or alternatively, the base station 110 and/or the UE 120 may reduce latency by opportunistically switching from the first time domain pattern 602 to the second time domain pattern 604. For example, the UE 120 may be able to transmit an uplink communication sooner using the second time domain pattern 604 rather than the first time domain pattern 602. In another example, the base station 110 may be able to transmit a downlink communication sooner using the second time domain pattern rather than first time domain pattern.

As further shown in FIG. 6A, the base station 110 and/or the UE 120 may begin a timer 606 based at least in part on switching to the second time domain pattern 604. The timer 606 may have an associated length that includes a quantity of symbols, a quantity of slots, a quantity of subframes, an amount of time, and/or another portion of the time domain. In example 600, the timer 606 is set for six slots. The base station 110 and/or the UE 120 may determine the associated length based at least in part on an indication of the length (e.g., transmitted from the base station 110 to the UE 120 and/or from the UE 120 to the base station 110), a value programmed (and/or otherwise preconfigured) into the base station 110 and/or the UE 120 (e.g., according to 3GPP specifications and/or another value), or a combination thereof (e.g., by selecting from a plurality of preconfigured values based at least in part on an indication transmitted from the base station 110 to the UE 120 and/or from the UE 120 to the base station 110).

In some aspects, the timer 606 may be based at least in part on the second time domain pattern 604. For example, the base station 110 may indicate different lengths corresponding to different time domain patterns of the plurality of candidate time domain patterns. Accordingly, the UE 120 may determine a length associated with the timer 606 based at least in part on a length corresponding to the second time domain pattern 604.

As an alternative, the timer 606 may be associated with a broadcast message, a message associated with the UE 120, and/or an SFI. For example, the base station 110 may indicate different lengths corresponding to different message formats (e.g., a Common_pattern_timer associated with the TDD-UL-DL-ConfigurationCommon data structure as defined in 3GPP specifications and/or another standard, a Dedicated_pattern_timer associated with the TDD-UL-DL-ConfigDedicated data structure as defined in 3GPP specifications and/or another standard, and/or an SFI_timer associated with the DCI format 2_0 as defined in 3GPP specifications and/or another standard). Accordingly, the UE 120 may determine a length associated with the timer 606 based at least in part on a type of instruction (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to instruct the UE 120 to switch from the first time domain pattern 602 to the second time domain pattern 604. Additionally, or alternatively, the UE 120 may determine a length associated with the timer 606 based at least in part on a type of indication (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to configure the second time domain pattern 604.

Based at least in part on expiry of the timer 606, the UE 120 may revert to the first time domain pattern 602. For example, the UE 120 may transmit one or more uplink communications in uplink slot "U" and/or flexible slots "F" and/or receive one or more downlink communications in downlink slots "D" and/or flexible slots "F." In some aspects, the UE 120 may revert to the first time domain pattern 602 as the default time domain pattern (e.g., the base station 110 may indicate the first time domain pattern 602 as the default time domain pattern). As an alternative, the UE 120 may revert to the first time domain pattern 602 because the first time domain pattern 602 was the most recently active time domain pattern. Accordingly, the base station 110 and the UE 120 may revert to the first time domain pattern 602 without exchanging additional signals.

Figure 6B:
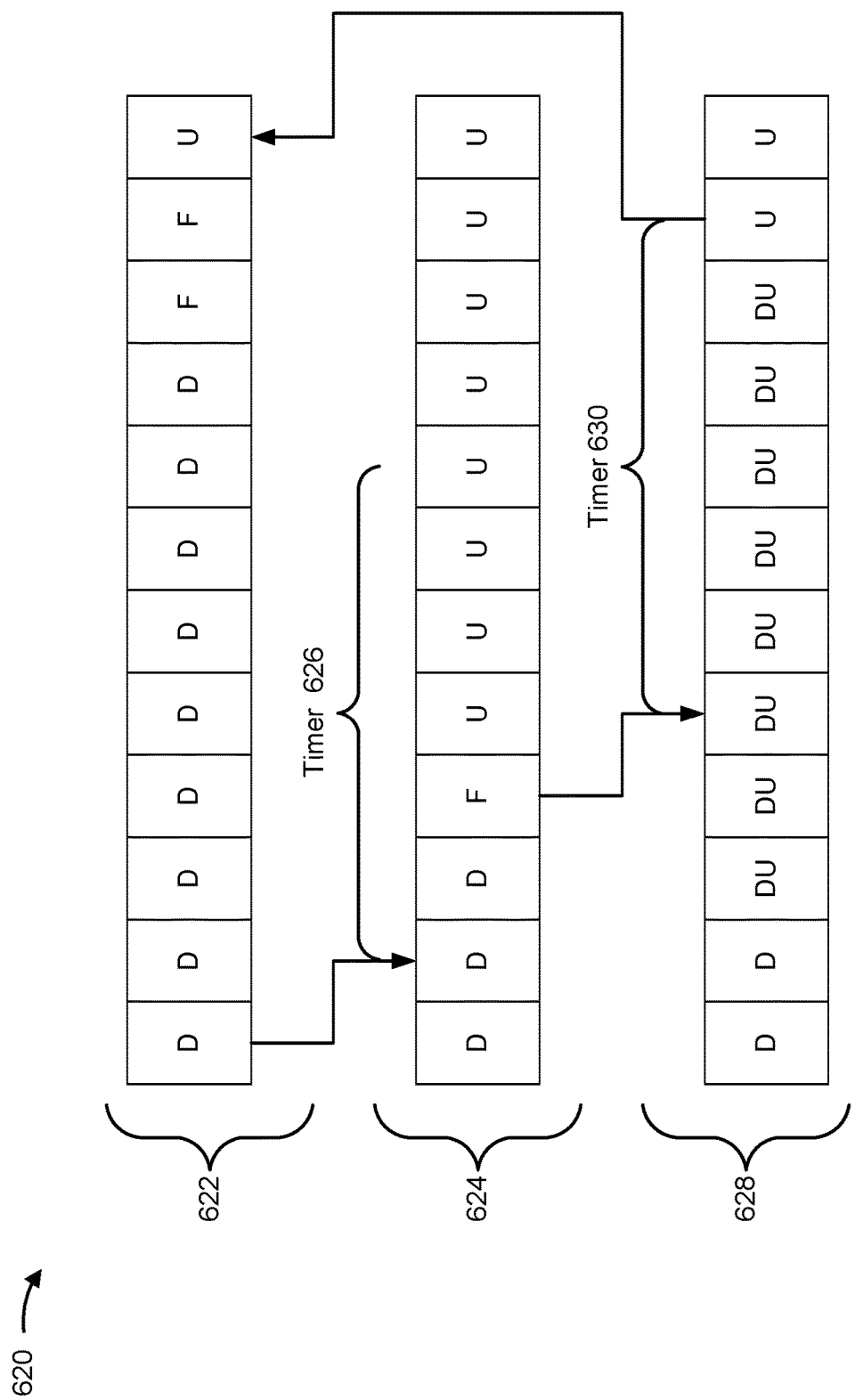

FIG. 6B is a diagram illustrating an example 620 associated with using different time domain patterns based on a timer, in accordance with the present disclosure. As shown in FIG. 6B, example 620 includes a first time domain pattern 622. The first time domain pattern 622 may include a quantity of downlink slots (e.g., nine downlink slots "D" as shown in example 620), a quantity of flexible slots (e.g., two flexible slots "F" as shown in example 620), and/or a quantity of uplink slots (e.g., one uplink slot "U" as shown in example 620). The first time domain pattern 622 may repeat over time. Although described below with reference to slots, the description similarly applies to a first time domain pattern with symbols (e.g., including nine downlink symbols, two flexible symbols, and one uplink symbol, as shown in example 620). Additionally, or alternatively, the UE 120 may switch from the first time domain pattern 622 to a second time domain pattern 624 (e.g., as described below) based at least in part on an amount of time (e.g., in ms). Additionally, or alternatively, although depicted as a TDD pattern (e.g., as described above in connection with FIG. 4), the first time domain pattern 622 may instead be a slot format pattern associated with a full duplex mode or a half duplex mode (e.g., as described above in connection with FIG. 5).

In some aspects the first time domain pattern 622 may be one of a plurality of candidate time domain patterns. For example, a base station (e.g., base station 110) may transmit, and a UE (e.g., UE 120) may receive, one or more indications to of the plurality of candidate time domain patterns. The indication(s) may include one or more RRC messages (e.g., including a TDD-UL-DL-ConfigurationCommon data structure as defined in 3GPP specifications and/or another standard, a TDD-UL-DL-ConfigDedicated data structure as defined in 3GPP specifications and/or another standard, and/or other similar data structures), one or more MAC-CEs, and/or DCI (e.g., DCI format 2_0 including an SFI associated with a SlotFormatCombination data structure, as defined in 3GPP specifications and/or another standard).

Accordingly, the UE 120 may transmit to and/or receive from the base station 110 based at least in part on the first time domain pattern 622. For example, the UE 120 may transmit one or more uplink communications in uplink slot "U" and/or flexible slots "F" and/or receive one or more downlink communications in downlink slots "D" and/or flexible slots "F."

As further shown in FIG. 6B, the base station 110 may instruct the UE 120 to switch from the first time domain pattern 622 to the second time domain pattern 624. For example, the second time domain pattern 624 may be included in the plurality of candidate time domain patterns. Accordingly, the base station 110 may transmit an RRC message, a MAC-CE, and/or DCI including an index and/or another indicator associated with the second time domain pattern 624. As an alternative, the UE 120 may indicate to the base station 110 that the UE 120 is switching from the first time domain pattern 622 to the second time domain pattern 624. For example, the UE 120 may transmit an RRC message, a MAC-CE, and/or UCI including the index and/or another indicator associated with the second time domain pattern 624. In some aspects, the UE 120 may transmit a request to use the second time domain pattern 624 (e.g., in an RRC message, a MAC-CE, and/or UCI), and the base station 110 may transmit an approval of the request (e.g., in an RRC message, a MAC-CE, and/or DCI). The second time domain pattern 624 may repeat over time, similar to the first time domain pattern 622.

In any of the aspects described above, the UE 120 may switch from the first time domain pattern 622 to the second time domain pattern 624 during a quantity of symbols and/or an amount of time (e.g., in ms). The quantity of symbols and/or the amount of time may be indicated by the base station 110 (e.g., in the instruction to switch from the first time domain pattern 622 to the second time domain pattern 624, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by μ and associated with corresponding SCSs) with corresponding quantities of symbols and/or amounts of time for switching time domain patterns.

In example 620, the second time domain pattern 624 includes a flexible slot "F" in place of what was a downlink slot "D" in the first time domain pattern 602. Additionally, the second time domain pattern 624 includes uplink slots "U" in place of what were downlink slots "D" and flexible slots "F" in the first time domain pattern 622. Accordingly, the UE 120 may transmit an uplink communication in an earlier slot. Other examples may include additional or alternative changes. For example, the second time domain pattern may include a downlink slot in place of what was an uplink slot in the first time domain pattern. In another example, the second time domain pattern may include a downlink slot in place of what was a flexible slot in the first time domain pattern. In yet another example, the second time domain pattern may include a flexible slot in place of what was an uplink slot in the first time domain pattern. Other examples may additionally or alternatively include changes associated with SBFD. For example, the second time domain pattern may include an SBFD slot in place of what was an uplink slot in the first time domain pattern. In another example, the second time domain pattern may include a downlink slot or an uplink slot in place of what was an SBFD slot in the first time domain pattern.

The UE 120 may transmit to and/or receive from the base station 110 based at least in part on the second time domain pattern 624. For example, the UE 120 may transmit one or more uplink communications in uplink slot "U" and/or flexible slots "F" and/or receive one or more downlink communications in downlink slots "D" and/or flexible slots "F."

By opportunistically switching from the first time domain pattern 622 to the second time domain pattern 624, the base station 110 and/or the UE 120 may reduce interference (e.g., cross-border interference as described above in connection with FIG. 3). As a result, the base station 110 and the UE 120 may experience increased quality and/or reliability of communications. Additionally, or alternatively, the base station 110 and/or the UE 120 may reduce latency by opportunistically switching from the first time domain pattern 622 to the second time domain pattern 624. For example, the UE 120 may be able to transmit an uplink communication sooner using the second time domain pattern 624 rather than the first time domain pattern 622. In another example, the base station 110 may be able to transmit a downlink communication sooner using the second time domain pattern rather than first time domain pattern.

As further shown in FIG. 6B, the base station 110 and/or the UE 120 may begin a timer 626 based at least in part on switching to the second time domain pattern 624. The timer 626 may have an associated length that includes a quantity of symbols, a quantity of slots, a quantity of subframes, an amount of time, and/or another portion of the time domain. In example 620, the timer 626 is set for seven slots. The base station 110 and/or the UE 120 may determine the associated length based at least in part on an indication of the length (e.g., transmitted from the base station 110 to the UE 120 and/or from the UE 120 to the base station 110), a value programmed (and/or otherwise preconfigured) into the base station 110 and/or the UE 120 (e.g., according to 3GPP specifications and/or another value), or a combination thereof (e.g., by selecting from a plurality of preconfigured values based at least in part on an indication transmitted from the base station 110 to the UE 120 and/or from the UE 120 to the base station 110).

In some aspects, the timer 626 may be based at least in part on the second time domain pattern 624. For example, the base station 110 may indicate different lengths corresponding to different time domain patterns of the plurality of candidate time domain patterns. Accordingly, the UE 120 may determine a length associated with the timer 626 based at least in part on a length corresponding to the second time domain pattern 624.

As an alternative, the timer 626 may be associated with a broadcast message, a message associated with the UE 120, and/or an SFI. For example, the base station 110 may indicate different lengths corresponding to different message formats (e.g., a Common_pattern_timer associated with the TDD-UL-DL-ConfigurationCommon data structure as defined in 3GPP specifications and/or another standard, a Dedicated_pattern_timer associated with the TDD-UL-DL-ConfigDedicated data structure as defined in 3GPP specifications and/or another standard, and/or an SFI_timer associated with the DCI format 2_0 as defined in 3GPP specifications and/or another standard). Accordingly, the UE 120 may determine a length associated with the timer 626 based at least in part on a type of instruction (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to instruct the UE 120 to switch from the first time domain pattern 622 to the second time domain pattern 624. Additionally, or alternatively, the UE 120 may determine a length associated with the timer 626 based at least in part on a type of indication (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to configure the second time domain pattern 624.

Before expiration of the timer 626, the base station 110 may instruct the UE 120 to switch from the second time domain pattern 624 to a third time domain pattern 628. For example, the third time domain pattern 628 may be included in the plurality of candidate time domain patterns. Accordingly, the base station 110 may transmit an RRC message, a MAC-CE, and/or DCI including an index and/or another indicator associated with the third time domain pattern 628. As an alternative, the UE 120 may indicate to the base station 110 that the UE 120 is switching from the second time domain pattern 624 to the third time domain pattern 628. For example, the UE 120 may transmit an RRC message, a MAC-CE, and/or UCI including the index and/or another indicator associated with the third time domain pattern 628. In some aspects, the UE 120 may transmit a request to use the third time domain pattern 628 (e.g., in an RRC message, a MAC-CE, and/or UCI), and the base station 110 may transmit an approval of the request (e.g., in an RRC message, a MAC-CE, and/or DCI). The third time domain pattern 628 may repeat over time, similar to the first time domain pattern 622 and the second time domain pattern 624.

In example 620, the third time domain pattern 628 includes an SBFD slots (shown as duplex or "DU" slots in FIG. 6B) in place of what were a downlink slot "D," a flexible slot "F," and uplink slots "U" in the second time domain pattern 624. Accordingly, the UE 120 may receive a downlink communication in an earlier slot. Other examples may include additional or alternative changes. For example, the third time domain pattern may include a downlink slot or an uplink slot in place of what was an uplink slot or a downlink slot, respectively in the second time domain pattern. In another example, the third time domain pattern may include a downlink slot or an uplink slot in place of what was a flexible slot in the second time domain pattern. In yet another example, the third time domain pattern may include a flexible slot in place of what was an uplink slot or a downlink slot in the second time domain pattern. Other examples may additionally or alternatively include a downlink slot or an uplink slot in place of what was an SBFD slot in the second time domain pattern.

The UE 120 may transmit to and/or receive from the base station 110 based at least in part on the third time domain pattern 628. For example, the UE 120 may transmit one or more uplink communications in uplink slot "U" and/or SBFD slots "DU" and/or receive one or more downlink communications in downlink slots "D" and/or SBFD slots "DU."

By opportunistically switching from the second time domain pattern 624 to the third time domain pattern 628, the base station 110 and/or the UE 120 may reduce interference (e.g., cross-border interference as described above in connection with FIG. 3). As a result, the base station 110 and the UE 120 may experience increased quality and/or reliability of communications. Additionally, or alternatively, the base station 110 and/or the UE 120 may reduce latency by opportunistically switching from the second time domain pattern 624 to the third time domain pattern 628. For example, the UE 120 may be able to receive a downlink communication sooner using the third time domain pattern 628 rather than the second time domain pattern 624. In another example, the base station 110 may be able to receive an uplink communication sooner using the third time domain pattern rather than second time domain pattern.

As further shown in FIG. 6B, the base station 110 and/or the UE 120 may begin a timer 630 based at least in part on switching to the third time domain pattern 628. The timer 630 may have an associated length that includes a quantity of symbols, a quantity of slots, a quantity of subframes, an amount of time, and/or another portion of the time domain. In example 620, the timer 630 is set for seven slots. The base station 110 and/or the UE 120 may determine the associated length based at least in part on an indication of the length (e.g., transmitted from the base station 110 to the UE 120 and/or from the UE 120 to the base station 110), a value programmed (and/or otherwise preconfigured) into the base station 110 and/or the UE 120 (e.g., according to 3GPP specifications and/or another value), or a combination thereof (e.g., by selecting from a plurality of preconfigured values based at least in part on an indication transmitted from the base station 110 to the UE 120 and/or from the UE 120 to the base station 110).

In some aspects, the timer 630 may be based at least in part on the third time domain pattern 628. For example, the base station 110 may indicate different lengths corresponding to different time domain patterns of the plurality of candidate time domain patterns. Accordingly, the UE 120 may determine a length associated with the timer 630 based at least in part on a length corresponding to the third time domain pattern 628.

As an alternative, the timer 630 may be associated with a broadcast message, a message associated with the UE 120, and/or an SFI. For example, the base station 110 may indicate different lengths corresponding to different message formats (e.g., a Common_pattern_timer associated with the TDD-UL-DL-ConfigurationCommon data structure as defined in 3GPP specifications and/or another standard, a Dedicated_pattern_timer associated with the TDD-UL-DL-ConfigDedicated data structure as defined in 3GPP specifications and/or another standard, and/or an SFI_timer associated with the DCI format 2_0 as defined in 3GPP specifications and/or another standard). Accordingly, the UE 120 may determine a length associated with the timer 630 based at least in part on a type of instruction (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to instruct the UE 120 to switch from the second time domain pattern 624 to the third time domain pattern 628. Additionally, or alternatively, the UE 120 may determine a length associated with the timer 630 based at least in part on a type of indication (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to configure the third time domain pattern 628.

Based at least in part on expiry of the timer 630, the UE 120 may revert to the first time domain pattern 622. Accordingly, the UE 120 may transmit one or more uplink communications in uplink slot "U" and/or flexible slots "F" and/or receive one or more downlink communications in downlink slots "D" and/or flexible slots "F." In some aspects, the UE 120 may revert to the first time domain pattern 622 as the default time domain pattern (e.g., the base station 110 may indicate the first time domain pattern 622 as the default time domain pattern). Accordingly, the base station 110 and the UE 120 may revert to the first time domain pattern 622 without exchanging additional signals.

Figure 6C:
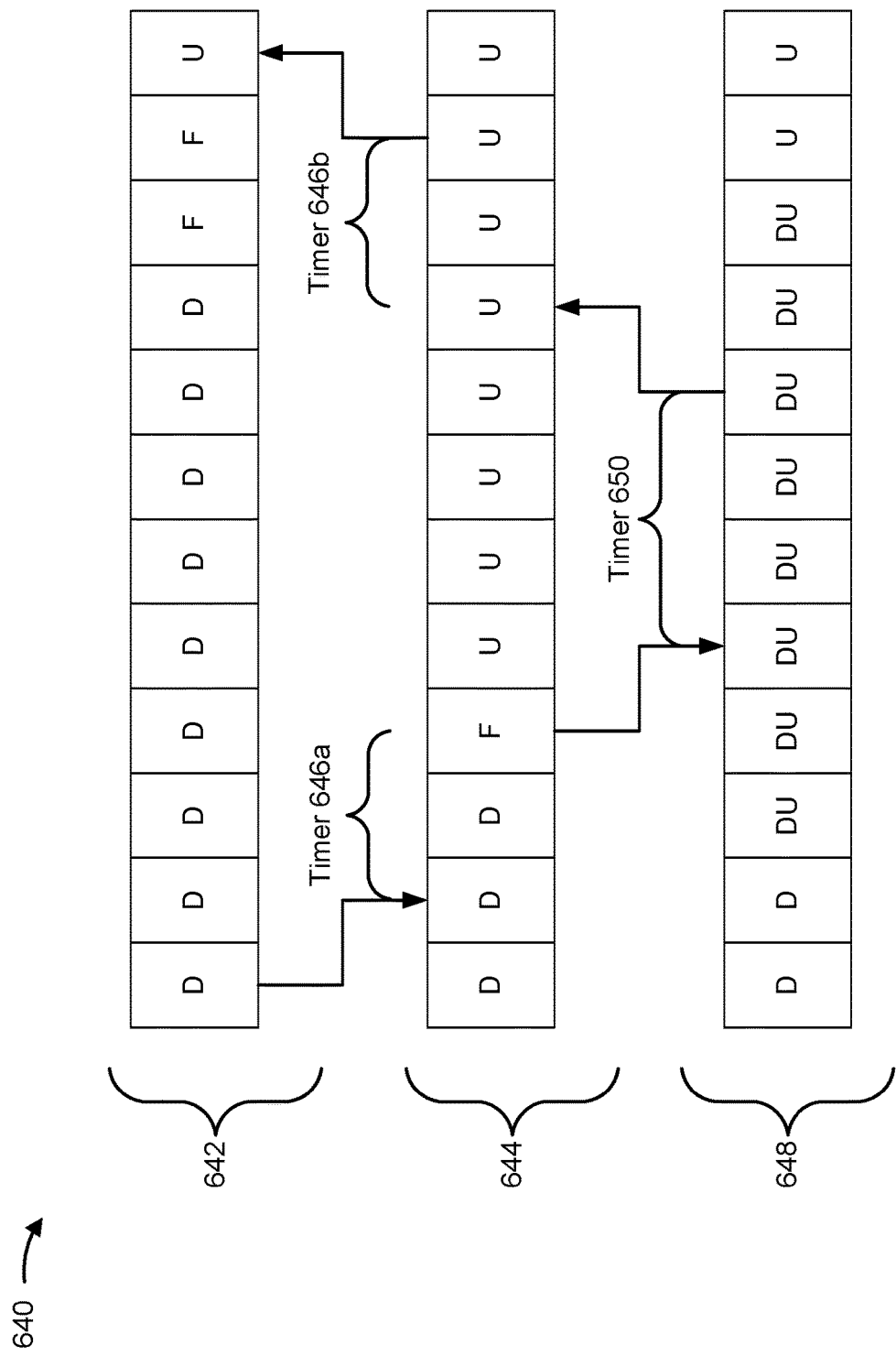

FIG. 6C is a diagram illustrating an example 640 associated with using different time domain patterns based on a timer, in accordance with the present disclosure. As shown in FIG. 6C, example 640 includes a first time domain pattern 642. The first time domain pattern 642 may include a quantity of downlink slots (e.g., nine downlink slots "D" as shown in example 640), a quantity of flexible slots (e.g., two flexible slots "F" as shown in example 640), and/or a quantity of uplink slots (e.g., one uplink slot "U" as shown in example 640). The first time domain pattern 642 may repeat over time. Although described below with reference to slots, the description similarly applies to a first time domain pattern with symbols (e.g., including nine downlink symbols, two flexible symbols, and one uplink symbol, as shown in example 620). Additionally, or alternatively, the UE 120 may switch from the first time domain pattern 642 to a second time domain pattern 644 (e.g., as described below) based at least in part on an amount of time (e.g., in ms). Additionally, or alternatively, although depicted as a TDD pattern (e.g., as described above in connection with FIG. 4), the first time domain pattern 642 may instead be a slot format pattern associated with a full duplex mode or a half duplex mode (e.g., as described above in connection with FIG. 5).

In some aspects the first time domain pattern 642 may be one of a plurality of candidate time domain patterns. For example, a base station (e.g., base station 110) may transmit, and a UE (e.g., UE 120) may receive, one or more indications to of the plurality of candidate time domain patterns. The indication(s) may include one or more RRC messages (e.g., including a TDD-UL-DL-ConfigurationCommon data structure as defined in 3GPP specifications and/or another standard, a TDD-UL-DL-ConfigDedicated data structure as defined in 3GPP specifications and/or another standard, and/or other similar data structures), one or more MAC-CEs, and/or DCI (e.g., DCI format 2_0 including an SFI associated with a SlotFormatCombination data structure, as defined in 3GPP specifications and/or another standard).

Accordingly, the UE 120 may transmit to and/or receive from the base station 110 based at least in part on the first time domain pattern 642. For example, the UE 120 may transmit one or more uplink communications in uplink slot "U" and/or flexible slots "F" and/or receive one or more downlink communications in downlink slots "D" and/or flexible slots "F."

As further shown in FIG. 6C, the base station 110 may instruct the UE 120 to switch from the first time domain pattern 642 to the second time domain pattern 644. For example, the second time domain pattern 644 may be included in the plurality of candidate time domain patterns. Accordingly, the base station 110 may transmit an RRC message, a MAC-CE, and/or DCI including an index and/or another indicator associated with the second time domain pattern 644. As an alternative, the UE 120 may indicate to the base station 110 that the UE 120 is switching from the first time domain pattern 642 to the second time domain pattern 644. For example, the UE 120 may transmit an RRC message, a MAC-CE, and/or UCI including the index and/or another indicator associated with the second time domain pattern 644. In some aspects, the UE 120 may transmit a request to use the second time domain pattern 644 (e.g., in an RRC message, a MAC-CE, and/or UCI), and the base station 110 may transmit an approval of the request (e.g., in an RRC message, a MAC-CE, and/or DCI). The second time domain pattern 644 may repeat over time, similar to the first time domain pattern 642.

In any of the aspects described above, the UE 120 may switch from the first time domain pattern 642 to the second time domain pattern 644 during a quantity of symbols and/or an amount of time (e.g., in ms). The quantity of symbols and/or the amount of time may be indicated by the base station 110 (e.g., in the instruction to switch from the first time domain pattern 642 to the second time domain pattern 644, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by μ and associated with corresponding SCSs) with corresponding quantities of symbols and/or amounts of time for switching time domain patterns.

In example 640, the second time domain pattern 644 includes a flexible slot "F" in place of what was a downlink slot "D" in the first time domain pattern 642. Additionally, the second time domain pattern 644 includes uplink slots "U" in place of what were downlink slots "D" and flexible slots "F" in the first time domain pattern 642. Accordingly, the UE 120 may transmit an uplink communication in an earlier slot. Other examples may include additional or alternative changes. For example, the second time domain pattern may include a downlink slot in place of what was an uplink slot in the first time domain pattern. In another example, the second time domain pattern may include a downlink slot in place of what was a flexible slot in the first time domain pattern. In yet another example, the second time domain pattern may include a flexible slot in place of what was an uplink slot in the first time domain pattern. Other examples may additionally or alternatively include changes associated with SBFD. For example, the second time domain pattern may include an SBFD slot in place of what was an uplink slot in the first time domain pattern. In another example, the second time domain pattern may include a downlink slot or an uplink slot in place of what was an SBFD slot in the first time domain pattern.

The UE 120 may transmit to and/or receive from the base station 110 based at least in part on the second time domain pattern 644. For example, the UE 120 may transmit one or more uplink communications in uplink slot "U" and/or flexible slots "F" and/or receive one or more downlink communications in downlink slots "D" and/or flexible slots "F."

By opportunistically switching from the first time domain pattern 642 to the second time domain pattern 644, the base station 110 and/or the UE 120 may reduce interference (e.g., cross-border interference as described above in connection with FIG. 3). As a result, the base station 110 and the UE 120 may experience increased quality and/or reliability of communications. Additionally, or alternatively, the base station 110 and/or the UE 120 may reduce latency by opportunistically switching from the first time domain pattern 642 to the second time domain pattern 644. For example, the UE 120 may be able to transmit an uplink communication sooner using the second time domain pattern 644 rather than the first time domain pattern 642. In another example, the base station 110 may be able to transmit a downlink communication sooner using the second time domain pattern rather than first time domain pattern.

As further shown in FIG. 6C, the base station 110 and/or the UE 120 may begin a timer 646 based at least in part on switching to the second time domain pattern 644. The timer 646 may have an associated length that includes a quantity of symbols, a quantity of slots, a quantity of subframes, an amount of time, and/or another portion of the time domain. In example 640, the timer 646 is set for six slots. The base station 110 and/or the UE 120 may determine the associated length based at least in part on an indication of the length (e.g., transmitted from the base station 110 to the UE 120 and/or from the UE 120 to the base station 110), a value programmed (and/or otherwise preconfigured) into the base station 110 and/or the UE 120 (e.g., according to 3GPP specifications and/or another value), or a combination thereof (e.g., by selecting from a plurality of preconfigured values based at least in part on an indication transmitted from the base station 110 to the UE 120 and/or from the UE 120 to the base station 110).

In some aspects, the timer 646 may be based at least in part on the second time domain pattern 644. For example, the base station 110 may indicate different lengths corresponding to different time domain patterns of the plurality of candidate time domain patterns. Accordingly, the UE 120 may determine a length associated with the timer 646 based at least in part on a length corresponding to the second time domain pattern 644.

As an alternative, the timer 646 may be associated with a broadcast message, a message associated with the UE 120, and/or an SFI. For example, the base station 110 may indicate different lengths corresponding to different message formats (e.g., a Common_pattern_timer associated with the TDD-UL-DL-ConfigurationCommon data structure as defined in 3GPP specifications and/or another standard, a Dedicated_pattern_timer associated with the TDD-UL-DL-ConfigDedicated data structure as defined in 3GPP specifications and/or another standard, and/or an SFI_timer associated with the DCI format 2_0 as defined in 3GPP specifications and/or another standard). Accordingly, the UE 120 may determine a length associated with the timer 646 based at least in part on a type of instruction (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to instruct the UE 120 to switch from the first time domain pattern 642 to the second time domain pattern 644. Additionally, or alternatively, the UE 120 may determine a length associated with the timer 646 based at least in part on a type of indication (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to configure the second time domain pattern 644.

Before expiration of the timer 646, the base station 110 may instruct the UE 120 to switch from the second time domain pattern 644 to a third time domain pattern 648. Accordingly, the UE 120 may pause the timer 646 (e.g., shown as portion 646a of timer 646 in FIG. 6C). In some aspects, the third time domain pattern 648 may be included in the plurality of candidate time domain patterns. Accordingly, the base station 110 may transmit an RRC message, a MAC-CE, and/or DCI including an index and/or another indicator associated with the third time domain pattern 648. As an alternative, the UE 120 may indicate to the base station 110 that the UE 120 is switching from the second time domain pattern 624 to the third time domain pattern 648. For example, the UE 120 may transmit an RRC message, a MAC-CE, and/or UCI including the index and/or another indicator associated with the third time domain pattern 648. In some aspects, the UE 120 may transmit a request to use the third time domain pattern 648 (e.g., in an RRC message, a MAC-CE, and/or UCI), and the base station 110 may transmit an approval of the request (e.g., in an RRC message, a MAC-CE, and/or DCI). The third time domain pattern 648 may repeat over time, similar to the first time domain pattern 642 and the second time domain pattern 644.

In example 640, the third time domain pattern 648 includes an SBFD slots (shown as duplex or "DU" slots in FIG. 6B) in place of what were a downlink slot "D," a flexible slot "F," and uplink slots "U" in the second time domain pattern 644. Accordingly, the UE 120 may receive a downlink communication in an earlier slot. Other examples may include additional or alternative changes. For example, the third time domain pattern may include a downlink slot or an uplink slot in place of what was an uplink slot or a downlink slot, respectively in the second time domain pattern. In another example, the third time domain pattern may include a downlink slot or an uplink slot in place of what was a flexible slot in the second time domain pattern. In yet another example, the third time domain pattern may include a flexible slot in place of what was an uplink slot or a downlink slot in the second time domain pattern. Other examples may additionally or alternatively include a downlink slot or an uplink slot in place of what was an SBFD slot in the second time domain pattern.

The UE 120 may transmit to and/or receive from the base station 110 based at least in part on the third time domain pattern 648. For example, the UE 120 may transmit one or more uplink communications in uplink slot "U" and/or SBFD slots "DU" and/or receive one or more downlink communications in downlink slots "D" and/or SBFD slots "DU."

By opportunistically switching from the second time domain pattern 644 to the third time domain pattern 648, the base station 110 and/or the UE 120 may reduce interference (e.g., cross-border interference as described above in connection with FIG. 3). As a result, the base station 110 and the UE 120 may experience increased quality and/or reliability of communications. Additionally, or alternatively, the base station 110 and/or the UE 120 may reduce latency by opportunistically switching from the second time domain pattern 644 to the third time domain pattern 648. For example, the UE 120 may be able to receive a downlink communication sooner using the third time domain pattern 648 rather than the second time domain pattern 644. In another example, the base station 110 may be able to receive an uplink communication sooner using the third time domain pattern rather than second time domain pattern.

As further shown in FIG. 6C, the base station 110 and/or the UE 120 may begin a timer 650 based at least in part on switching to the third time domain pattern 648. The timer 650 may have an associated length that includes a quantity of symbols, a quantity of slots, a quantity of subframes, an amount of time, and/or another portion of the time domain. In example 640, the timer 650 is set for four slots. The base station 110 and/or the UE 120 may determine the associated length based at least in part on an indication of the length (e.g., transmitted from the base station 110 to the UE 120 and/or from the UE 120 to the base station 110), a value programmed (and/or otherwise preconfigured) into the base station 110 and/or the UE 120 (e.g., according to 3GPP specifications and/or another value), or a combination thereof (e.g., by selecting from a plurality of preconfigured values based at least in part on an indication transmitted from the base station 110 to the UE 120 and/or from the UE 120 to the base station 110).

In some aspects, the timer 650 may be based at least in part on the third time domain pattern 648. For example, the base station 110 may indicate different lengths corresponding to different time domain patterns of the plurality of candidate time domain patterns. Accordingly, the UE 120 may determine a length associated with the timer 650 based at least in part on a length corresponding to the third time domain pattern 648.

As an alternative, the timer 650 may be associated with a broadcast message, a message associated with the UE 120, and/or an SFI. For example, the base station 110 may indicate different lengths corresponding to different message formats (e.g., a Common_pattern_timer associated with the TDD-UL-DL-ConfigurationCommon data structure as defined in 3GPP specifications and/or another standard, a Dedicated_pattern_timer associated with the TDD-UL-DL-ConfigDedicated data structure as defined in 3GPP specifications and/or another standard, and/or an SFI_timer associated with the DCI format 2_0 as defined in 3GPP specifications and/or another standard). Accordingly, the UE 120 may determine a length associated with the timer 650 based at least in part on a type of instruction (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to instruct the UE 120 to switch from the second time domain pattern 644 to the third time domain pattern 648. Additionally, or alternatively, the UE 120 may determine a length associated with the timer 650 based at least in part on a type of indication (e.g., a broadcast message, such as one including the TDD-UL-DL-ConfigurationCommon data structure; a message associated with the UE 120, such as one including the TDD-UL-DL-ConfigDedicated data structure; and/or an SFI included in DCI format 2_0) that the base station 110 used to configure the third time domain pattern 648.

Based at least in part on expiry of the timer 650, the UE 120 may revert to the second time domain pattern 644. Accordingly, the UE 120 may transmit one or more uplink communications in uplink slot "U" and/or flexible slots "F" and/or receive one or more downlink communications in downlink slots "D" and/or flexible slots "F." In some aspects, the UE 120 may revert to the second time domain pattern 644 as the most recently active time domain pattern. Accordingly, the base station 110 and the UE 120 may revert to the second time domain pattern 644 without exchanging additional signals.

Additionally, as shown in FIG. 6C, the UE 120 may resume timer 646. Based at least in part on expiry of the resumed timer 646 (e.g., shown as portion 646b of timer 646 in FIG. 6C), the UE 120 may revert to the first time domain pattern 642. Accordingly, the UE 120 may transmit one or more uplink communications in uplink slot "U" and/or flexible slots "F" and/or receive one or more downlink communications in downlink slots "D" and/or flexible slots "F." In some aspects, the UE 120 may revert to the first time domain pattern 642 as the default time domain pattern (e.g., the base station 110 may indicate the first time domain pattern 602 as the default time domain pattern). Accordingly, the base station 110 and the UE 120 may revert to the first time domain pattern 642 without exchanging additional signals.

By using techniques as described in connection with FIGS. 6A-6C, the base station 110 may transmit an instruction to the UE 120 to switch time domain patterns, and the UE 120 may revert to previous time domain patterns based at least in part on expiry of one or more timers, such that the base station 110 and the UE 120 conserve network overhead, transmission resources, and decoding resources. Additionally, or alternatively, the UE 120 may transmit an indication to the base station 110 that the UE 120 is switching time domain patterns, and the base station 110 may determine when the UE 120 reverts to previous time domain pattern based at least in part on one or more timers and without a subsequent indication transmitted from the UE 120 to the base station 110, such that the base station 110 and the UE 120 conserve network overhead, transmission resources, and decoding resources.

As indicated above, FIGS. 6A-6C are provided as examples. Other examples may differ from what is described with respect to FIGS. 6A-6C.

Figure 7A:
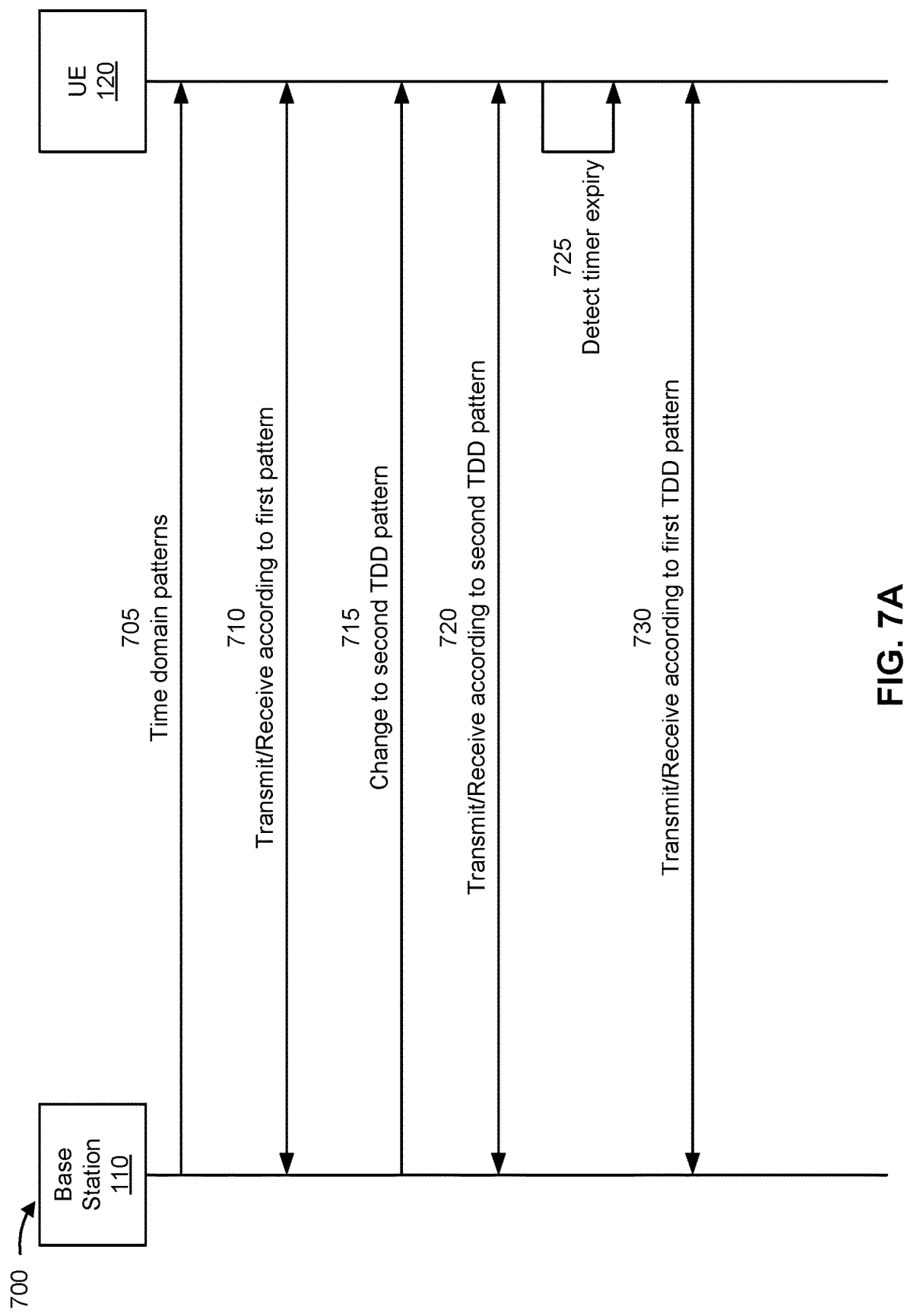
FIGS. 7A and 7B are diagrams illustrating additional examples associated with using different time domain patterns based on a timer, in accordance with the present disclosure.

FIG. 7A is a diagram illustrating an example 700 associated with using different time domain patterns based on a timer, in accordance with the present disclosure. As shown in FIG. 7A, a base station 110 and a UE 120 may communicate with one another.

As shown in connection with reference number 705, the base station 110 may transmit, and the UE 120 may receive, an indication of at least two time domain patterns. For example, the base station 110 may transmit an RRC message, a MAC-CE, and/or DCI, as described above in connection with FIGS. 6A-6C. Each time domain pattern may include one or more downlink slots, flexible slots, uplink slots, and/or SBFD slots. Although described below with reference to slots, the description similarly applies to time domain patterns with symbols (e.g., including downlink symbols, flexible symbols, uplink symbols, and/or SBFD symbols). Additionally, or alternatively, the UE 120 may switch from one time domain pattern to a different time domain pattern (e.g., as described below) based at least in part on an amount of time (e.g., in ms).

As shown in connection with reference number 710, the base station 110 and the UE 120 may transmit and/or receive based at least in part on a first pattern of the at least two time domain patterns. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 715, the base station 110 may transmit, and the UE 120 may receive, an instruction to switch to a second pattern, of the at least two time domain patterns, from the first pattern. For example, the base station 110 may transmit an RRC message, a MAC-CE, and/or DCI, as described above in connection with FIGS. 6A-6C.

Additionally, or alternatively, the UE 120 may transmit, and the base station 110 may receive, an indication that the UE 120 has switched (or is requesting to switch) to the second pattern, of the at least two time domain patterns, from the first pattern. For example, the UE 120 may transmit an RRC message, a MAC-CE, and/or UCI, as described above in connection with FIGS. 6A-6C.

In any of the aspects described above, the UE 120 may switch from the first pattern to the second pattern during a quantity of symbols and/or an amount of time (e.g., in ms). The quantity of symbols and/or the amount of time may be indicated by the base station 110 (e.g., in the instruction to switch from the first pattern to the second pattern, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by $\mu$ and associated with corresponding SCSs) with corresponding quantities of symbols and/or amounts of time for switching time domain patterns.

Accordingly, as shown in connection with reference number 720, the base station 110 and the UE 120 may transmit and/or receive based at least in part on the second pattern. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 725, the UE 120 may detect expiry of a timer associated with the second pattern. The timer may be associated with a broadcast message, a message associated with the UE, an SFI, and/or the second pattern, as described above in connection with FIGS. 6A-6C.

Accordingly, as shown in connection with reference number 730, the base station 110 and the UE 120 may transmit and/or receive based at least in part on the first pattern, based at in least in part on the timer expiring. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

Figure 7B:
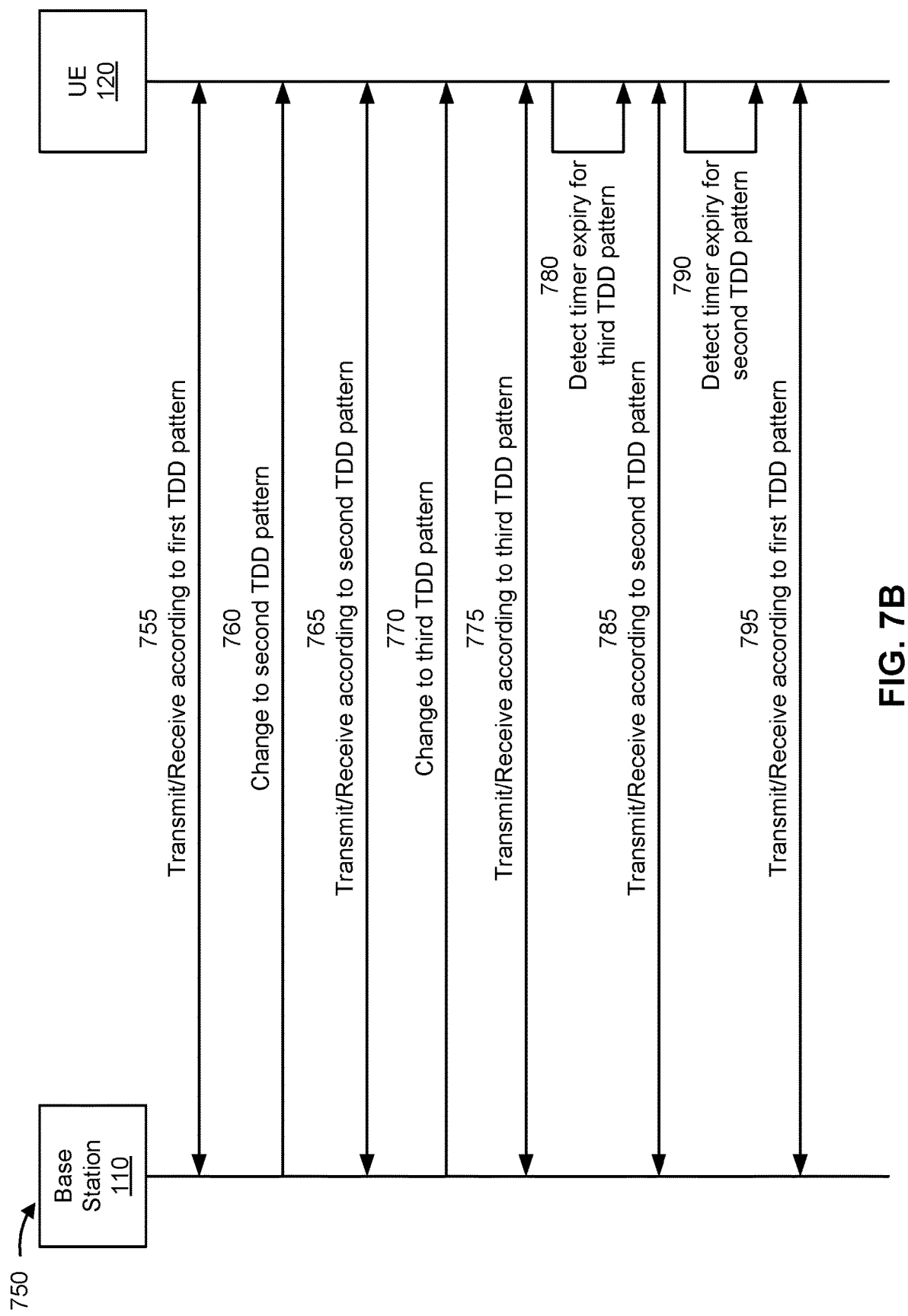

FIG. 7B is a diagram illustrating an example 750 associated with using different time domain patterns based on a timer, in accordance with the present disclosure. As shown in FIG. 7B, a base station 110 and a UE 120 may communicate with one another.

In some aspects, the base station 110 indicate, to the UE 120, at least two time domain patterns. For example, the base station 110 may transmit an RRC message, a MAC-CE, and/or DCI, as described above in connection with FIGS. 6A-6C. Each time domain pattern may include one or more downlink slots, flexible slots, uplink slots, and/or SBFD slots. Although described below with reference to slots, the description similarly applies to time domain patterns with symbols (e.g., including downlink symbols, flexible symbols, uplink symbols, and/or SBFD symbols). Additionally, or alternatively, the UE 120 may switch from one time domain pattern to a different time domain pattern (e.g., as described below) based at least in part on an amount of time (e.g., in ms).

As shown in connection with reference number 755, the base station 110 and the UE 120 may transmit and/or receive based at least in part on a first pattern of the at least two time domain patterns. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 760, the base station 110 may transmit, and the UE 120 may receive, an instruction to switch to a second pattern, of the at least two time domain patterns, from the first pattern. For example, the base station 110 may transmit an RRC message, a MAC-CE, and/or DCI, as described above in connection with FIGS. 6A-6C.

Additionally, or alternatively, the UE 120 may transmit, and the base station 110 may receive, an indication that the UE 120 has switched (or is requesting to switch) to the second pattern, of the at least two time domain patterns, from the first pattern. For example, the UE 120 may transmit an RRC message, a MAC-CE, and/or UCI, as described above in connection with FIGS. 6A-6C.

In any of the aspects described above, the UE 120 may switch from the first pattern to the second pattern during a quantity of symbols and/or an amount of time (e.g., in ms). The quantity of symbols and/or the amount of time may be indicated by the base station 110 (e.g., in the instruction to switch from the first pattern to the second pattern, as described above) and/or based at least in part on a programmed (and/or otherwise preconfigured) rule. For example, the rule may include a table (e.g., defined in 3GPP specifications and/or another standard) that associates different SCSs and/or numerologies (e.g., represented by μ and associated with corresponding SCSs) with corresponding quantities of symbols and/or amounts of time for switching time domain patterns.

Accordingly, as shown in connection with reference number 765, the base station 110 and the UE 120 may transmit and/or receive based at least in part on the second pattern. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 770, the base station 110 may transmit, and the UE 120 may receive, an instruction to switch to a third pattern, of the at least two time domain patterns, from the second pattern. For example, the base station 110 may transmit an RRC message, a MAC-CE, and/or DCI, as described above in connection with FIGS. 6A-6C.

Additionally, or alternatively, the UE 120 may transmit, and the base station 110 may receive, an indication that the UE 120 has switched (or is requesting to switch) to the third pattern, of the at least two time domain patterns, from the second pattern. For example, the UE 120 may transmit an RRC message, a MAC-CE, and/or UCI, as described above in connection with FIGS. 6A-6C.

Accordingly, as shown in connection with reference number 775, the base station 110 and the UE 120 may transmit and/or receive based at least in part on the third pattern. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 780, the UE 120 may detect expiry of a timer associated with the third pattern. The timer may be associated with a broadcast message, a message associated with the UE, an SFI, and/or the third pattern, as described above in connection with FIGS. 6A-6C.

Accordingly, as shown in connection with reference number 785, the base station 110 and the UE 120 may transmit and/or receive based at least in part on the second pattern, based at in least in part on the timer expiring. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

As shown in connection with reference number 790, the UE 120 may detect expiry of an additional timer, associated with the second pattern. The additional timer may be associated with a broadcast message, a message associated with the UE, an SFI, and/or the second pattern, as described above in connection with FIGS. 6A-6C.

Accordingly, as shown in connection with reference number 795, the base station 110 and the UE 120 may transmit and/or receive based at least in part on the first pattern, based at in least in part on the additional timer expiring. For example, the UE 120 may transmit, and the base station 110 may receive, one or more uplink communications in an uplink slot, a flexible slot, and/or an SBFD slot. Additionally, or alternatively, the base station 110 may transmit, and the UE 120 may receive, one or more downlink communications in a downlink slot, a flexible slot, and/or an SBFD slot.

By using techniques as described in connection with FIGS. 7A-7B, the base station 110 may transmit an instruction to the UE 120 to switch time domain patterns, and the UE 120 may revert to previous time domain patterns based at least in part on expiry of one or more timers, such that the base station 110 and the UE 120 conserve network overhead, transmission resources, and decoding resources. Additionally, or alternatively, the UE 120 may transmit an indication to the base station 110 that the UE 120 is switching time domain patterns, and the base station 110 may determine when the UE 120 reverts to previous time domain pattern based at least in part on one or more timers and without a subsequent indication transmitted from the UE 120 to the base station 110, such that the base station 110 and the UE 120 conserve network overhead, transmission resources, and decoding resources.

As indicated above, FIGS. 7A-7B are provided as examples. Other examples may differ from what is described with respect to FIGS. 7A-7B.

Figure 8:
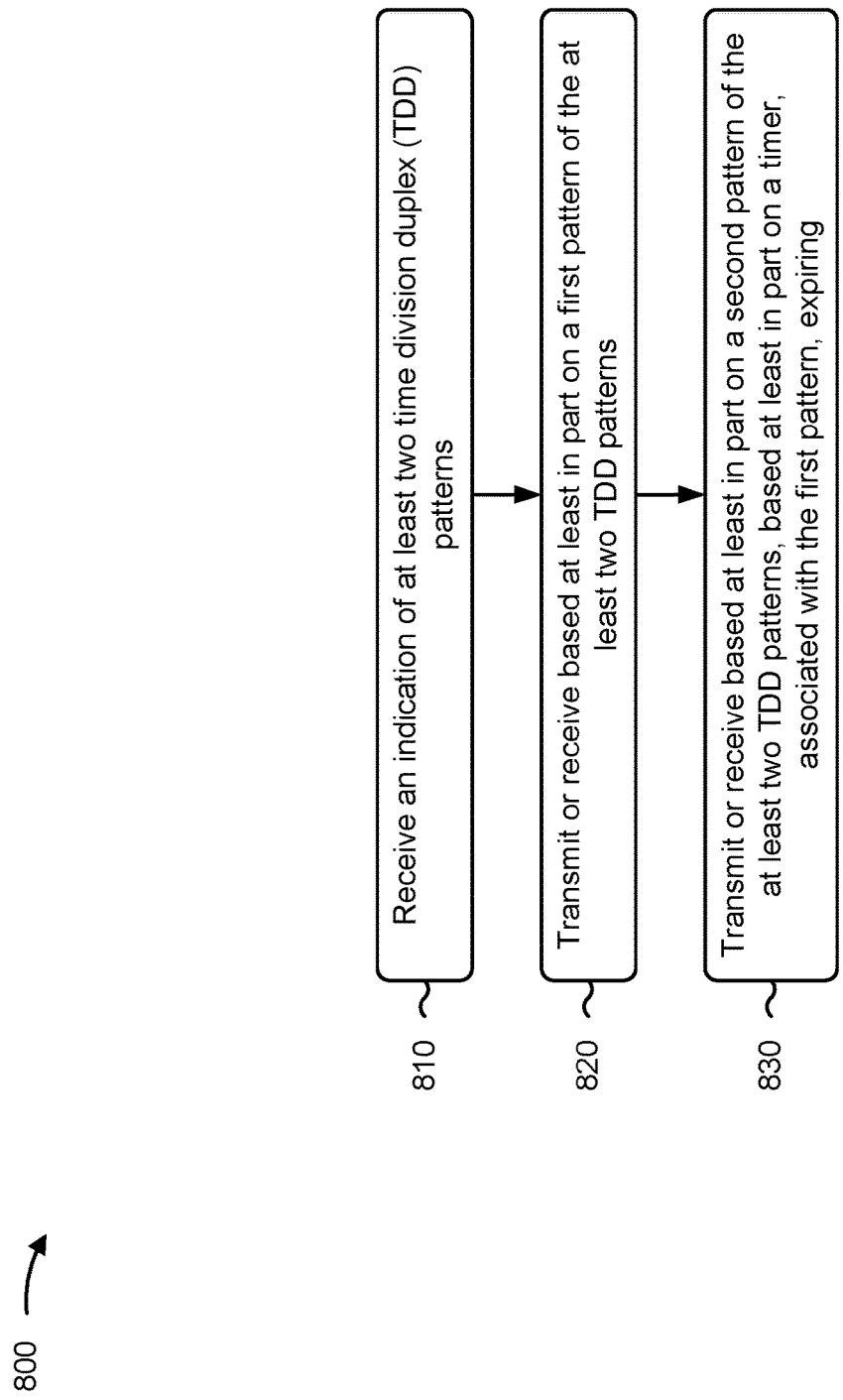
FIGS. 8 and 9 are diagrams illustrating example processes associated with using different time domain patterns based on a timer, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with using different time domain patterns based on a timer.

As shown in FIG. 8, in some aspects, process 800 may include receiving, from a base station (e.g., base station 110 and/or apparatus 1100 of FIG. 11), an indication of at least two time domain patterns (block 810). For example, the UE (e.g., using reception component 1002, depicted in FIG. 10) may receive the indication of at least two time domain patterns, as described above.

As further shown in FIG. 8, in some aspects, process 800 may include transmitting or receiving based at least in part on a first pattern of the at least two time domain patterns (block 820). For example, the UE (e.g., using reception component 1002 and/or transmission component 1004, depicted in FIG. 10) may transmit or receive based at least in part on the first pattern of the at least two time domain patterns, as described above.

As further shown in FIG. 8, in some aspects, process 800 may include transmitting or receiving based at least in part on a second pattern of the at least two time domain patterns, based at least in part on a timer, associated with the first pattern, expiring (block 830). For example, the UE (e.g., using reception component 1002 and/or transmission component 1004) may transmit or receive based at least in part on the second pattern of the at least two time domain patterns, based at least in part on the timer expiring, as described above.

Process 800 may include additional aspects, such as any single aspect or any combination of aspects described below and/or in connection with one or more other processes described elsewhere herein.

In a first aspect, process 800 further includes receiving (e.g., using reception component 1002), from the base station, an instruction to switch to the first pattern from another of the at least two time domain patterns.

In a second aspect, alone or in combination with the first aspect, process 800 further includes transmitting (e.g., using transmission component 1004), to the base station, an indication that the UE has switched from another of the at least two time domain patterns to the first pattern.

In a third aspect, alone or in combination with one or more of the first and second aspects, the indication includes a broadcast message, and the timer is associated with the broadcast message.

In a fourth aspect, alone or in combination with one or more of the first through third aspects, the indication includes a message associated with the UE, and the timer is associated with the message.

In a fifth aspect, alone or in combination with one or more of the first through fourth aspects, the indication includes an SFI associated with the UE, and the timer is associated with the SFI.

In a sixth aspect, alone or in combination with one or more of the first through fifth aspects, the timer is based at least in part on the first pattern.

In a seventh aspect, alone or in combination with one or more of the first through sixth aspects, the second pattern is a default pattern of the at least two time domain patterns.

In an eighth aspect, alone or in combination with one or more of the first through seventh aspects, process 800 further includes transmitting or receiving (e.g., using reception component 1002 and/or transmission component 1004) based at least in part on a third pattern of the at least two time domain patterns before the timer, associated with the first pattern, expires, where the second pattern is used based at least in part on an additional timer, associated with the third pattern, expiring.

In a ninth aspect, alone or in combination with one or more of the first through eighth aspects, process 800 further includes transmitting or receiving (e.g., using reception component 1002 and/or transmission component 1004) based at least in part on a third pattern of the at least two time domain patterns, based at least in part on an additional timer, associated with the second pattern, expiring.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
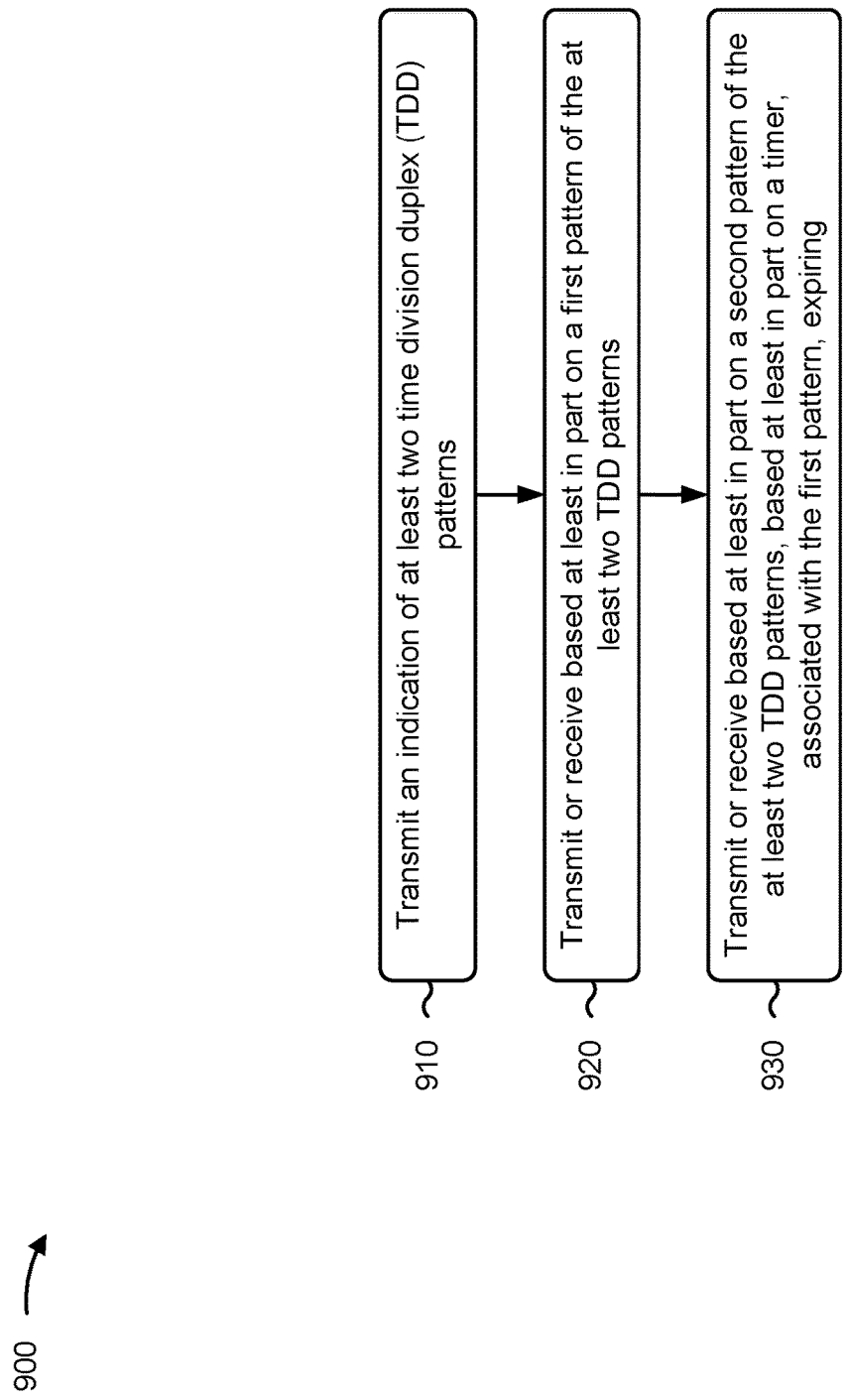

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with using different time domain patterns based on a timer.

As shown in FIG. 9, in some aspects, process 900 may include transmitting, to a UE (e.g., UE 120 and/or apparatus 1000 of FIG. 10), an indication of at least two time domain patterns (block 910). For example, the base station (e.g., using transmission component 1104, depicted in FIG. 11) may transmit the indication of at least two time domain patterns, as described above.

As further shown in FIG. 9, in some aspects, process 900 may include transmitting or receiving based at least in part on a first pattern of the at least two time domain patterns (block 920). For example, the base station (e.g., using transmission component 1104 and/or reception component 1102, depicted in FIG. 11) may transmit or receive based at least in part on the first pattern of the at least two time domain patterns, as described above.

As further shown in FIG. 9, in some aspects, process 900 may include transmitting or receiving based at least in part on a second pattern of the at least two time domain patterns, based at least in part on a timer, associated with the first pattern, expiring (block 930). For example, the base station (e.g., using transmission component 1104 and/or reception component 1102) may transmit or receive based at least in part on the second pattern of the at least two time domain patterns, based at least in part on the timer expiring, as described above.

Process 900 may include additional aspects, such as any single aspect or any combination of aspects described below and/or in connection with one or more other processes described elsewhere herein.

In a first aspect, process 900 further includes transmitting (e.g., using transmission component 1104), to the UE, an instruction to switch to the first pattern from another of the at least two time domain patterns.

In a second aspect, alone or in combination with the first aspect, process 900 further includes receiving (e.g., using reception component 1102), from the UE, an indication that the UE has switched from another of the at least two time domain patterns to the first pattern.

In a third aspect, alone or in combination with one or more of the first and second aspects, the indication includes a broadcast message, and the timer is associated with the broadcast message.

In a fourth aspect, alone or in combination with one or more of the first through third aspects, the indication includes a message associated with the UE, and the timer is associated with the message.

In a fifth aspect, alone or in combination with one or more of the first through fourth aspects, the indication includes an SFI associated with the UE, and the timer is associated with the SFI.

In a sixth aspect, alone or in combination with one or more of the first through fifth aspects, the timer is based at least in part on the first pattern.

In a seventh aspect, alone or in combination with one or more of the first through sixth aspects, the second pattern is a default pattern of the at least two time domain patterns.

In an eighth aspect, alone or in combination with one or more of the first through seventh aspects, process 900 further includes transmitting or receiving (e.g., using transmission component 1104 and/or reception component 1102) based at least in part on a third pattern of the at least two time domain patterns before the timer, associated with the first pattern, expires, where the second pattern is used based at least in part on an additional timer, associated with the third pattern, expiring.

In a ninth aspect, alone or in combination with one or more of the first through eighth aspects, process 900 further includes transmitting or receiving (e.g., using transmission component 1104 and/or reception component 1102) based at least in part on a third pattern of the at least two time domain patterns, based at least in part on an additional timer, associated with the second pattern, expiring.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
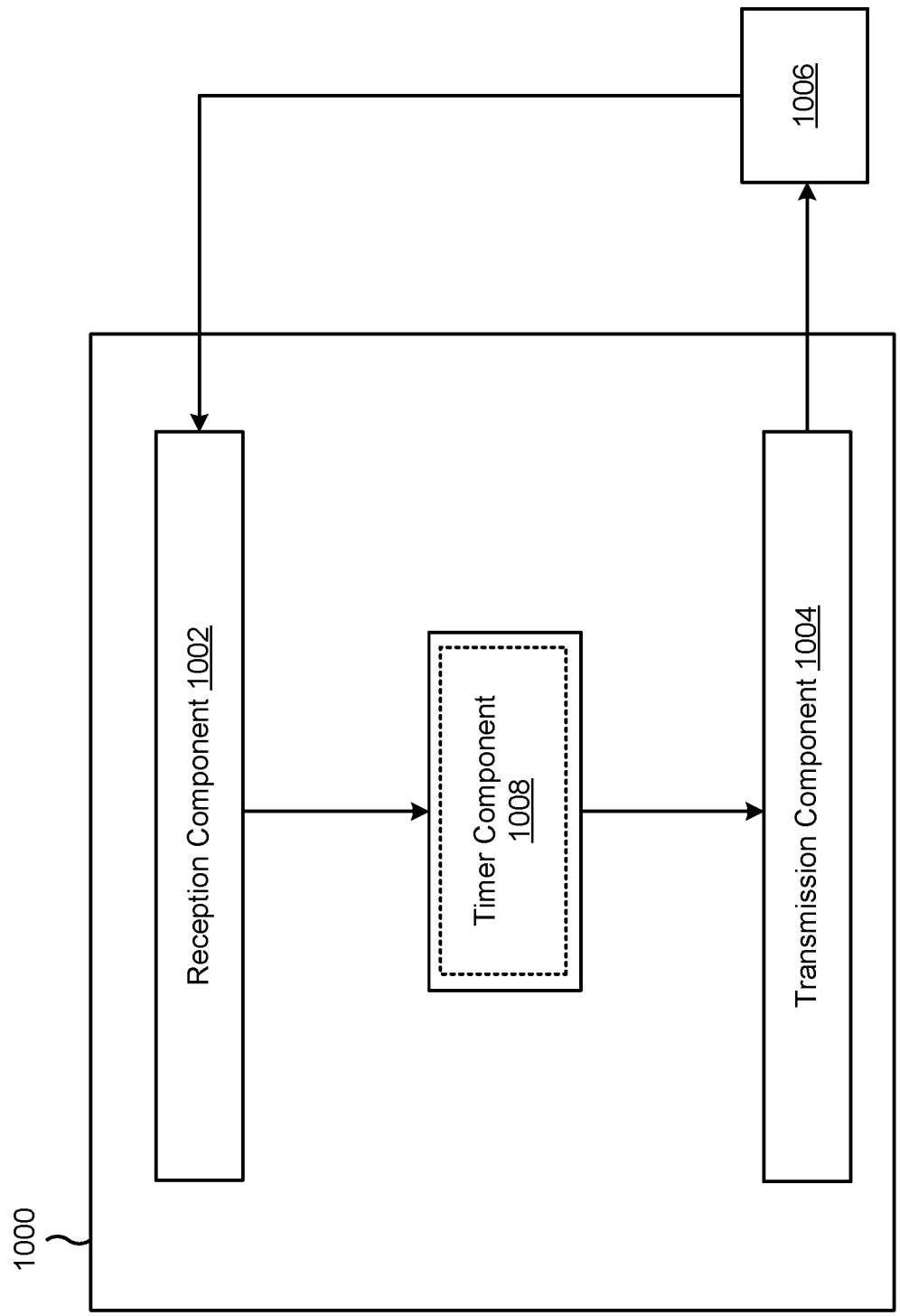
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a timer component 1008, among other examples.

In some aspects, the apparatus 1000 may be configured to perform one or more operations described herein in connection with FIGS. 6A-7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive, from the apparatus 1006, an indication of at least two time domain patterns. Accordingly, the transmission component 1004 may transmit (e.g., to the apparatus 1006) and/or the reception component 1002 may receive (e.g., from the apparatus 1006) based at least in part on a first pattern of the at least two time domain patterns. Additionally, the transmission component 1004 may transmit (e.g., to the apparatus 1006) and/or the reception component 1002 may receive (e.g., from the apparatus 1006) based at least in part on a second pattern of the at least two time domain patterns, based at least in part on a timer, associated with the first pattern, expiring. For example, the timer component 1008 may begin the timer when the transmission component 1004 and/or the reception component 1002 use the first pattern and thereafter determine when the timer expires. In some aspects, the timer component 1008 may include a MIMO detector, a receive processor, a transmit MIMO processor, a transmit processor, a controller/processor, a memory, or a combination thereof, of the UE described above in connection with FIG. 2.

In some aspects, the reception component 1002 may receive, from the apparatus 1006, an instruction to switch to the first pattern from another of the at least two time domain patterns. Additionally, or alternatively the transmission component 1004 may transmit, to the apparatus 1006, an indication that the apparatus 1000 has switched from another of the at least two time domain patterns to the first pattern.

In some aspects, the transmission component 1004 may transmit (e.g., to the apparatus 1006) and/or the reception component 1002 may receive (e.g., from the apparatus 1006) based at least in part on a third pattern of the at least two time domain patterns before the timer, associated with the first pattern, expires. Accordingly, the second pattern may be used based at least in part on an additional timer, associated with the third pattern, expiring. For example, the timer component 1008 may begin the additional timer when the transmission component 1004 and/or the reception component 1002 use the third pattern and thereafter determine when the additional timer expires.

As an alternative, the transmission component 1004 may transmit (e.g., to the apparatus 1006) and/or the reception component 1002 may receive (e.g., from the apparatus 1006) based at least in part on a third pattern of the at least two time domain patterns, based at least in part on an additional timer, associated with the second pattern, expiring. For example, the timer component 1008 may begin the additional timer when the transmission component 1004 and/or the reception component 1002 use the second pattern and thereafter determine when the additional timer expires.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
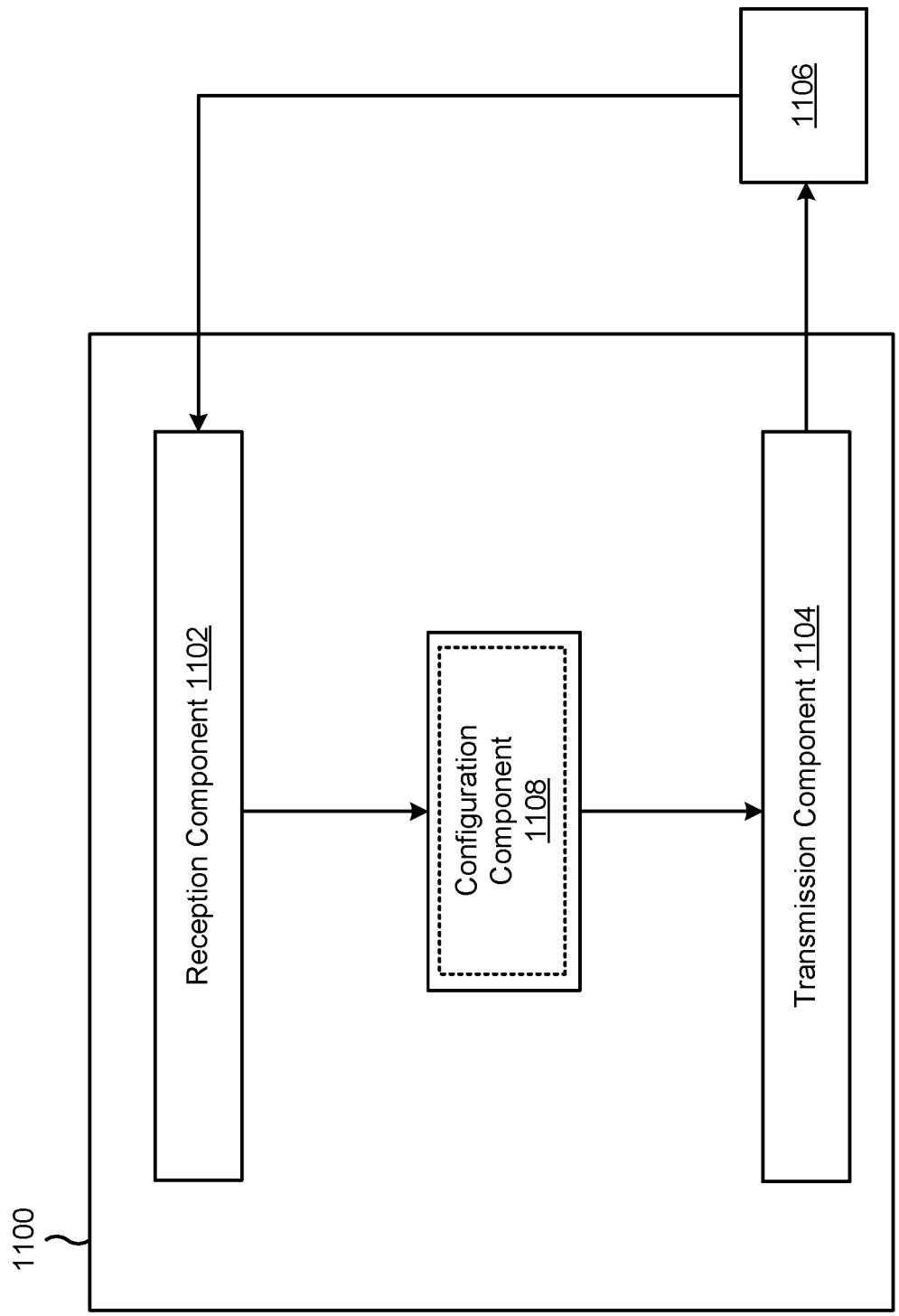

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a configuration component 1108, among other examples.

In some aspects, the apparatus 1100 may be configured to perform one or more operations described herein in connection with FIGS. 6A-7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the transmission component 1104 may transmit, to the apparatus 1106, an indication of at least two time domain patterns. Accordingly, the transmission component 1104 may transmit (e.g., to the apparatus 1106) and/or the reception component 1102 may receive (e.g., from the apparatus 1106) based at least in part on a first pattern of the at least two time domain patterns. Additionally, the transmission component 1104 may transmit (e.g., to the apparatus 1106) and/or the reception component 1102 may receive (e.g., from the apparatus 1106) based at least in part on a second pattern of the at least two time domain patterns, based at least in part on a timer, associated with the first pattern, expiring. For example, the configuration component 1108 may determine to use the first pattern and thereafter determine to use the second pattern based at least in part on expiry of the timer. In some aspects, the configuration component 1108 may include a MIMO detector, a receive processor, a transmit MIMO processor, a transmit processor, a controller/processor, a memory, or a combination thereof, of the base station described above in connection with FIG. 2.

In some aspects, the transmission component 1104 may transmit, to the apparatus 1106, an instruction to switch to the first pattern from another of the at least two time domain patterns. Additionally, or alternatively, the reception component 1102 may receive, from the apparatus 1106, an indication that the apparatus 1106 has switched from another of the at least two time domain patterns to the first pattern.

In some aspects, the transmission component 1104 may transmit (e.g., to the apparatus 1106) and/or the reception component 1102 may receive (e.g., from the apparatus 1106) based at least in part on a third pattern of the at least two time domain patterns before the timer, associated with the first pattern, expires. Accordingly, the second pattern may be used based at least in part on an additional timer, associated with the third pattern, expiring. For example, the configuration component 1108 may determine to use the third pattern and thereafter determine to use the second pattern based at least in part on expiry of the additional timer.

As an alternative, the transmission component 1104 may transmit (e.g., to the apparatus 1106) and/or the reception component 1102 may receive (e.g., from the apparatus 1106) based at least in part on a third pattern of the at least two time domain patterns, based at least in part on an additional timer, associated with the second pattern, expiring. For example, the configuration component 1108 may determine to use the second pattern and thereafter determine to use the third pattern based at least in part on expiry of the additional timer.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, an indication of at least two time domain patterns; transmitting or receiving based at least in part on a first pattern of the at least two time domain patterns; and transmitting or receiving based at least in part on a second pattern of the at least two time domain patterns, based at least in part on a timer, associated with the first pattern, expiring.

Aspect 2: The method of Aspect 1, further comprising: receiving, from the base station, an instruction to switch to the first pattern from another of the at least two time domain patterns.

Aspect 3: The method of any one of Aspects 1 through 2, further comprising: transmitting, to the base station, an indication that the UE has switched from another of the at least two time domain patterns to the first pattern.

Aspect 4: The method of any one of Aspects 1 through 3, wherein the indication includes a broadcast message, and the timer is associated with the broadcast message.

Aspect 5: The method of any one of Aspects 1 through 3, wherein the indication includes a message associated with the UE, and the timer is associated with the message.

Aspect 6: The method of any one of Aspects 1 through 3, wherein the indication includes a slot format indicator (SFI) associated with the UE, and the timer is associated with the SFI.

Aspect 7: The method of any one of Aspects 1 through 3, wherein the timer is based at least in part on the first pattern.

Aspect 8: The method of any one of Aspects 1 through 7, wherein the second pattern is a default pattern of the at least two time domain patterns.

Aspect 9: The method of any one of Aspects 1 through 8, further comprising: transmitting or receiving based at least in part on a third pattern of the at least two time domain patterns before the timer, associated with the first pattern, expires, wherein the second pattern is used based at least in part on an additional timer, associated with the third pattern, expiring.

Aspect 10: The method of any one of Aspects 1 through 7, further comprising: transmitting or receiving based at least in part on a third pattern of the at least two time domain patterns, based at least in part on an additional timer, associated with the second pattern, expiring.

Aspect 11: A method of wireless communication performed by a base station, comprising: transmitting, to a user equipment (UE), an indication of at least two time domain patterns; transmitting or receiving based at least in part on a first pattern of the at least two time domain patterns; and transmitting or receiving based at least in part on a second pattern of the at least two time domain patterns, based at least in part on a timer, associated with the first pattern, expiring.

Aspect 12: The method of Aspect 1, further comprising: transmitting, to the UE, an instruction to switch to the first pattern from another of the at least two time domain patterns.

Aspect 13: The method of any one of Aspects 11 through 12, further comprising: receiving, from the UE, an indication that the UE has switched from another of the at least two time domain patterns to the first pattern.

Aspect 14: The method of any one of Aspects 11 through 13, wherein the indication includes a broadcast message, and the timer is associated with the broadcast message.

Aspect 15: The method of any one of Aspects 11 through 13, wherein the indication includes a message associated with the UE, and the timer is associated with the message.

Aspect 16: The method of any one of Aspects 11 through 13, wherein the indication includes a slot format indicator (SFI) associated with the UE, and the timer is associated with the SFI.

Aspect 17: The method of any one of Aspects 11 through 13, wherein the timer is based at least in part on the first pattern.

Aspect 18: The method of any one of Aspects 11 through 17, wherein the second pattern is a default pattern of the at least two time domain patterns.

Aspect 19: The method of any one of Aspects 11 through 18, further comprising: transmitting or receive based at least in part on a third pattern of the at least two time domain patterns before the timer, associated with the first pattern, expires, wherein the second pattern is used based at least in part on an additional timer, associated with the third pattern, expiring.

Aspect 20: The method of any one of Aspects 11 through 17, further comprising: transmitting or receiving based at least in part on a third pattern of the at least two time domain patterns, based at least in part on an additional timer, associated with the second pattern, expiring.

Aspect 21: An apparatus for wireless communication at a device, comprising a processor; memory coupled with the processor; and instructions stored in the memory and executable by the processor to cause the apparatus to perform the method of one or more Aspects of Aspects 1-10.

Aspect 22: A device for wireless communication, comprising a memory and one or more processors coupled to the memory, the memory and the one or more processors configured to perform the method of one or more Aspects of Aspects 1-10.

Aspect 23: An apparatus for wireless communication, comprising at least one means for performing the method of one or more Aspects of Aspects 1-10.

Aspect 24: A non-transitory computer-readable medium storing code for wireless communication, the code comprising instructions executable by a processor to perform the method of one or more Aspects of Aspects 1-10.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 26: An apparatus for wireless communication at a device, comprising a processor; memory coupled with the processor; and instructions stored in the memory and executable by the processor to cause the apparatus to perform the method of one or more Aspects of Aspects 11-20.

Aspect 27: A device for wireless communication, comprising a memory and one or more processors coupled to the memory, the memory and the one or more processors configured to perform the method of one or more Aspects of Aspects 11-20.

Aspect 28: An apparatus for wireless communication, comprising at least one means for performing the method of one or more Aspects of Aspects 11-20.

Aspect 29: A non-transitory computer-readable medium storing code for wireless communication, the code comprising instructions executable by a processor to perform the method of one or more Aspects of Aspects 11-20.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
receive, from a network node, an indication of at least three time division duplex (TDD) patterns;
transmit or receive based at least in part on a first pattern of the at least three TDD patterns;
transmit or receive based at least in part on a second pattern of the at least three TDD patterns, based at least in part on one or more of:
a first timer, associated with the first pattern, expiring, or
a first instruction to switch from the first pattern to the second pattern; and
transmit or receive based at least in part on a third pattern of the at least three TDD patterns based at least in part on one or more of:
a second timer, different from the first timer and associated with the second pattern, expiring, or
a second instruction to switch from the second pattern to the third pattern.

2. The UE of claim 1, wherein the one or more processors are further configured to:
receive, from the network node, at least one of the first instruction or the second instruction.

3. The UE of claim 1, wherein the one or more processors are further configured to:
transmit, to the network node, an indication that the UE has switched from the first pattern to the second pattern or from the second pattern to the third pattern.

4. The UE of claim 1, wherein the indication includes a broadcast message, and at least one of the first timer or the second timer is associated with the broadcast message.

5. The UE of claim 1, wherein the indication includes a message associated with the UE, and at least one of the first timer or the second timer is associated with the message.

6. The UE of claim 1, wherein the indication includes a slot format indicator (SFI) associated with the UE, and at least one of the first timer or the second timer is associated with the SFI.

7. The UE of claim 1, wherein the first timer is based at least in part on the first pattern.

8. The UE of claim 1, wherein the third pattern is a default pattern of the at least three TDD patterns.

9. The UE of claim 1, wherein the one or more processors, to transmit or receive based at least in part on the third pattern, are configured to:
transmit or receive based at least in part on the third pattern before the first timer expires and after the second timer expires.

10. The UE of claim 1, wherein the one or more processors are further configured to:
transmit or receive based at least in part on the second pattern based at least in part on second pattern expiring; and
resume the first timer associated with the second pattern based at least in part on switching from the third pattern to the second pattern to transmit or receive based at least in part on the second pattern.

11. A network node for wireless communication, comprising:
a memory; and
one or more processors coupled to the memory, the one or more processors configured to:
transmit, to a user equipment (UE), an indication of at least three time domain patterns;
transmit or receive based at least in part on a first pattern of the at least three time domain patterns;
transmit or receive based at least in part on a second pattern of the at least three time domain patterns, based at least in part on one or more of:
a first timer, associated with the first pattern, expiring, or
a first instruction to switch from the first pattern to the second pattern; and
transmit or receive based at least in part on a third pattern of the at least three time domain patterns based at least in part on one or more of:
a second timer, different from the first timer and associated with the second pattern, expiring, or
a second instruction to switch from the second pattern to the third pattern.

12. The network node of claim 11, wherein the one or more processors are further configured to:
transmit, to the UE, at least one of the first instruction or the second instruction.

13. The network node of claim 11, wherein the one or more processors are further configured to:
receive, from the UE, an indication that the UE has switched from to the first pattern to the second pattern or from the second pattern to the third pattern.

14. The network node of claim 11, wherein the indication includes a broadcast message, and at least one of the first timer or the second timer is associated with the broadcast message.

15. The network node of claim 11, wherein the indication includes a message associated with the UE, and at least one of the first timer or the second timer is associated with the message.

16. The network node of claim 11, wherein the indication includes a slot format indicator (SFI) associated with the UE, and at least one of the first timer or the second timer is associated with the SFI.

17. The network node of claim 11, wherein the first timer is based at least in part on the first pattern.

18. The network node of claim 11, wherein the third pattern is a default pattern of the at least three time domain patterns.

19. The network node of claim 11, wherein the one or more processors, to transmit or receive based at least in part on the third pattern, are configured to:
transmit or receive based at least in part on the third pattern before the first timer expires and after the second timer expires.

20. The network node of claim 11, wherein the one or more processors are further configured to:
transmit or receive based at least in part on the second pattern based at least in part on second pattern expiring; and
resume the first timer associated with the second pattern based at least in part on switching from the third pattern to the second pattern to transmit or receive based at least in part on the second pattern.

21. A method of wireless communication performed by a user equipment (UE), comprising:
receiving, from a network node, an indication of at least three time domain patterns;
transmitting or receiving based at least in part on a first pattern of the at least three time domain patterns; and
transmitting or receiving based at least in part on a second pattern of the at least three time domain patterns, based at least in part on one or more of:
a first timer, associated with the first pattern, expiring, or
a first instruction to switch from the first pattern to the second pattern; and
transmitting or receiving based at least in part on a third pattern of the at least three time domain patterns based at least in part on one or more of:
a second timer, different from the first timer and associated with the second pattern, expiring, or
a second instruction to switch from the second pattern to the third pattern.

22. The method of claim 21, further comprising:
receiving, from the network node, at least one of the first instruction.

23. The method of claim 21, wherein the indication includes a broadcast message, and at least one of the first timer or the second timer is associated with the broadcast message.

24. The method of claim 21, wherein the indication includes a message associated with the UE, and at least one the first timer or the second timer is associated with the message.

25. The method of claim 21, wherein the indication includes a slot format indicator (SFI) associated with the UE, and at least one of the first timer or the second timer is associated with the SFI.

26. The method of claim 21, wherein the first timer is based at least in part on the first pattern.

27. The method of claim 21, wherein the third pattern is a default pattern of the at least three time domain patterns.

28. The method of claim 21, wherein transmitting or receiving based at least in part on the third pattern comprises:
transmitting or receiving based at least in part on the third pattern before the first timer expires and after the second timer expires.

29. The method of claim 21, further comprising:
transmitting or receiving based at least in part on the second pattern based at least in part on second pattern expiring; and
resuming the first timer associated with the second pattern based at least in part on switching from the third pattern to the second pattern to transmit or receive based at least in part on the second pattern.

30. A method of wireless communication performed by a network node, comprising:
transmitting, to a user equipment (UE), an indication of at least three time domain patterns;
transmitting or receiving based at least in part on a first pattern of the at least three time domain patterns;
transmitting or receiving based at least in part on a second pattern of the at least three time domain patterns, based at least in part on one or more of:
a first timer, associated with the first pattern, expiring, or
a first instruction to switch from the first pattern to the second pattern; and
transmitting or receiving based at least in part on a third pattern of the at least three time domain patterns based at least in part on one or more of:
a second timer, different from the first timer and associated with the second pattern, expiring, or
a second instruction to switch from the second pattern to the third pattern.

\* \* \* \* \*